United States Patent
Sugiyama et al.

(10) Patent No.: US 8,433,580 B2
(45) Date of Patent: Apr. 30, 2013

(54) INFORMATION PROCESSING SYSTEM, WHICH ADDS INFORMATION TO TRANSLATION AND CONVERTS IT TO VOICE SIGNAL, AND METHOD OF PROCESSING INFORMATION FOR THE SAME

(75) Inventors: Akihiko Sugiyama, Tokyo (JP); Kiyoshi Yamabana, Tokyo (JP); Kenji Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/582,360

(22) PCT Filed: Dec. 13, 2004

(86) PCT No.: PCT/JP2004/018582
§ 371 (c)(1),
(2), (4) Date: Jun. 9, 2006

(87) PCT Pub. No.: WO2005/057549
PCT Pub. Date: Jun. 23, 2005

(65) Prior Publication Data
US 2007/0081529 A1 Apr. 12, 2007

(30) Foreign Application Priority Data
Dec. 12, 2003 (JP) ................. 2003-415598

(51) Int. Cl.
*G10L 21/00* (2006.01)

(52) U.S. Cl.
USPC ........ 704/277; 704/270; 704/270.1; 704/275; 704/2; 704/7; 704/3

(58) Field of Classification Search .................. 704/270, 704/275, 260, 1, 9
See application file for complete search history.

(56) References Cited

U.S. PATENT DOCUMENTS 4,974,191 A * 11/1990 Amirghodsi et al. ............. 704/8
5,495,557 A * 2/1996 Hyman et al. ................ 704/272
(Continued)

FOREIGN PATENT DOCUMENTS

CN 1379392 A 11/2002
EP 0 831 460 A2 3/1998
(Continued)

OTHER PUBLICATIONS

Shriberg, Elizabeth, Rebecca Bates, Andreas Stolcke, Paul Taylor, Daniel Jurafsky, Klaus Ries, Noah Coccaro, Rachel Martin, Marie Meteer, and Carol Van Ess-Dykema. 1998. Can prosody aid the automatic classification of dialog acts in conversational speech? Language and Speech, 41(3-4):439-487.*

(Continued)

*Primary Examiner* — Greg Borsetti
(74) *Attorney, Agent, or Firm* — Foley & Lardner LLP

(57) ABSTRACT

An information processing system includes an information processing unit, an information changing unit, and an information reproducing unit. The information processing unit processes the information received by a sensor and transmits the result of processing to the information reproducing unit. The information changing unit adds or deletes information to or from the result of processing, obtained by the information processing unit, by using an information analysis unit and a change-processing unit. If the information processing is interpretation that includes voice recognition, translation and voice synthesis, the first language received by the sensor is translated into the second language by the information processing unit and is reproduced by the information reproducing unit.

10 Claims, 14 Drawing Sheets

U.S. PATENT DOCUMENTS

| | | | | |
|---|---|---|---|---|
| 5,758,318 | A | * | 5/1998 | Kojima et al. ............... 704/251 |
| 5,778,082 | A | | 7/1998 | Chu et al. |
| 5,835,881 | A | | 11/1998 | Trovato et al. |
| 5,860,064 | A | | 1/1999 | Henton |
| 6,157,913 | A | * | 12/2000 | Bernstein ...................... 704/275 |
| 6,167,366 | A | * | 12/2000 | Johnson ............................ 704/2 |
| 6,246,981 | B1 | * | 6/2001 | Papineni et al. .............. 704/235 |
| 6,249,720 | B1 | * | 6/2001 | Kubota et al. ...................... 701/1 |
| 6,314,411 | B1 | * | 11/2001 | Armstrong ...................... 706/11 |
| 6,347,261 | B1 | | 2/2002 | Sakaue et al. |
| 6,385,581 | B1 | | 5/2002 | Stephenson |
| 6,385,584 | B1 | * | 5/2002 | McAllister et al. ........... 704/275 |
| 6,505,162 | B1 | * | 1/2003 | Wang et al. ................... 704/275 |
| 6,510,411 | B1 | * | 1/2003 | Norton et al. ................. 704/254 |
| 6,513,011 | B1 | * | 1/2003 | Uwakubo ...................... 704/275 |
| 6,542,788 | B2 | | 4/2003 | Hosonuma et al. |
| 6,603,863 | B1 | * | 8/2003 | Nagayoshi ..................... 381/380 |
| 6,658,388 | B1 | * | 12/2003 | Kleindienst et al. .......... 704/275 |
| 6,665,640 | B1 | * | 12/2003 | Bennett et al. ................ 704/257 |
| 6,665,641 | B1 | * | 12/2003 | Coorman et al. ............. 704/260 |
| 6,697,708 | B2 | * | 2/2004 | Takagi et al. ................. 700/245 |
| 6,751,591 | B1 | * | 6/2004 | Gorin et al. ................... 704/257 |
| 6,773,344 | B1 | * | 8/2004 | Gabai et al. ........................ 463/1 |
| 6,853,880 | B2 | | 2/2005 | Sakagami et al. |
| 6,904,334 | B2 | | 6/2005 | Asano et al. |
| 6,940,953 | B1 | * | 9/2005 | Eberle et al. ................ 379/88.13 |
| 6,944,592 | B1 | * | 9/2005 | Pickering ...................... 704/251 |
| 6,952,665 | B1 | * | 10/2005 | Shimomura et al. .............. 704/2 |
| 6,967,455 | B2 | | 11/2005 | Nakadai et al. |
| 6,975,993 | B1 | * | 12/2005 | Keiller .......................... 704/275 |
| 7,003,459 | B1 | * | 2/2006 | Gorin et al. ................... 704/240 |
| 7,461,001 | B2 | * | 12/2008 | Liqin et al. .................... 704/277 |
| 7,526,361 | B2 | | 4/2009 | Nakadai et al. |
| 7,587,053 | B1 | | 9/2009 | Pereira |
| 8,200,493 | B1 | | 6/2012 | Cosatto et al. |
| 2001/0007096 | A1 | * | 7/2001 | Yamada et al. ............... 704/258 |
| 2001/0028719 | A1 | | 10/2001 | Hayashi |
| 2001/0041977 | A1 | * | 11/2001 | Aoyagi et al. ................ 704/246 |
| 2002/0010714 | A1 | | 1/2002 | Hetherington |
| 2002/0042713 | A1 | * | 4/2002 | Kim et al. ..................... 704/272 |
| 2002/0111794 | A1 | | 8/2002 | Yamamoto et al. |
| 2002/0181723 | A1 | | 12/2002 | Kataoka |
| 2003/0004730 | A1 | * | 1/2003 | Yuschik ........................ 704/275 |
| 2003/0009342 | A1 | | 1/2003 | Haley |
| 2003/0028380 | A1 | * | 2/2003 | Freeland et al. .............. 704/260 |
| 2003/0055532 | A1 | | 3/2003 | Sakagami et al. |
| 2003/0130851 | A1 | * | 7/2003 | Nakakita et al. .............. 704/275 |
| 2003/0182122 | A1 | | 9/2003 | Horinaka et al. |
| 2004/0056885 | A1 | | 3/2004 | Azami et al. |
| 2006/0064202 | A1 | | 3/2006 | Gutmann et al. |
| 2006/0173577 | A1 | | 8/2006 | Takeda et al. |

FOREIGN PATENT DOCUMENTS

| | | |
|---|---|---|
| EP | 1 113 422 A2 | 7/2001 |
| JP | 63-168774 | 7/1988 |
| JP | 63-204465 | 8/1988 |
| JP | 09-131468 | 5/1997 |
| JP | 10-136327 | 5/1998 |
| JP | 2001-014237 | 1/2001 |
| JP | 2001-100784 | 4/2001 |
| JP | 2001-100788 | 4/2001 |
| JP | 2001-117752 | 4/2001 |
| JP | 2001-117921 | 4/2001 |
| JP | 2001-117922 | 4/2001 |
| JP | 2001-339703 | 12/2001 |
| JP | 2002-244688 A | 8/2002 |
| JP | 2002-283261 | 10/2002 |
| JP | 2002-351305 | 12/2002 |
| JP | 2003-62777 A | 3/2003 |
| JP | 2003-263192 | 9/2003 |
| JP | 2003-271172 A | 9/2003 |
| JP | 2003-319085 | 11/2003 |
| WO | WO 02/078328 A1 | 10/2002 |

OTHER PUBLICATIONS

Stolcke et al. "Dialogue Act Modeling for Automatic Tagging and Recognition of Conversational Speech" 2000.*

Jurafsky et al. "Automatic Detection of Discourse Structure for Speech Recognition and Understanding" 1997.*

Zue et al. "Integration of Speech Recognition and Natural Language Processin the MIT VOYAGER System" 1991.*

Seneff. "TINA: A Natural Language System for Spoken Language Applications" 1992.*

Cole et al. "The Challenge of Spoken Language Systems: Research Directions for the Nineties" 1995.*

Watanabe et al. "An Automatic Interpretation System for Travel Conversation" Oct. 20, 2000.*

Yamabana et al. "An Interactive Translation Support Facility for Non-Professional Users" 1997.*

Yamabana et al. "Lexicalized Tree Automata-based Grammars for Translating Conversational Texts" 2000.*

Doi et al. "Long Sentence Analysis by Domain-Specific Pattern Grammar" 1993.*

P. Elinas et al., "Homer: Human Oriented MEssenger Robot," in Proceedings of AAAI Spring Symposium on Human Interaction with Autonomous Systems in Complex Environments, XP-002454698, Mar. 2003, 7 pages.

Hiroshi G. Okuno et al., "Human-Robot Interaction Through Real-Time Auditory and Visual Multiple-Talker Tracking," Proceedings of the 2001 IEEE/RSJ International Conference on Intelligent Robots and Systems, Oct. 2001, pp. 1402-1409.

Michita Imai et al., "Physical Relation and Expression: Joint Attention for Human-Robot Interaction," IEEE International Workshop on Robot and Human Interactive Communication, Sep. 2001, pp. 512-517.

Michita Imai et al., "Robot Mediated Round Table: Analysis of The Effect or Robot's Gaze," Proceedings of the 2002 IEEE Int. Workshop on Robot and Human Interactive Communication, Sep. 2002, pp. 411-416.

Kazuhiro Nakadai et al., "Robot Recognizes Three Simultaneous Speech by Active Audition," Proceedings of the 2003 IEEE International Conference on Robotics & Automation, Sep. 2003, pp. 398-405.

Akihiko Sugiyama et al., USPTO Office Action, U.S. Appl. No. 12/230,590, Nov. 2, 2009, 12 pages.

Akihiko Sugiyama et al., USPTO Office Action, U.S. Appl. No. 12/230,590, Jun. 4, 2010, 11 pages.

Akihiko Sugiyama et al., USPTO Office Action, U.S. Appl. No. 12/230,590, Jun. 17, 2011, 19 pages.

USPTO Office Action, U.S. Appl. No. 12/230,590, May 22, 2012, 15 pages.

USPTO Notice of Allowance, U.S. Appl. No. 12/230,590, Feb. 25, 2013, 8 pages.

* cited by examiner

FIG. 13
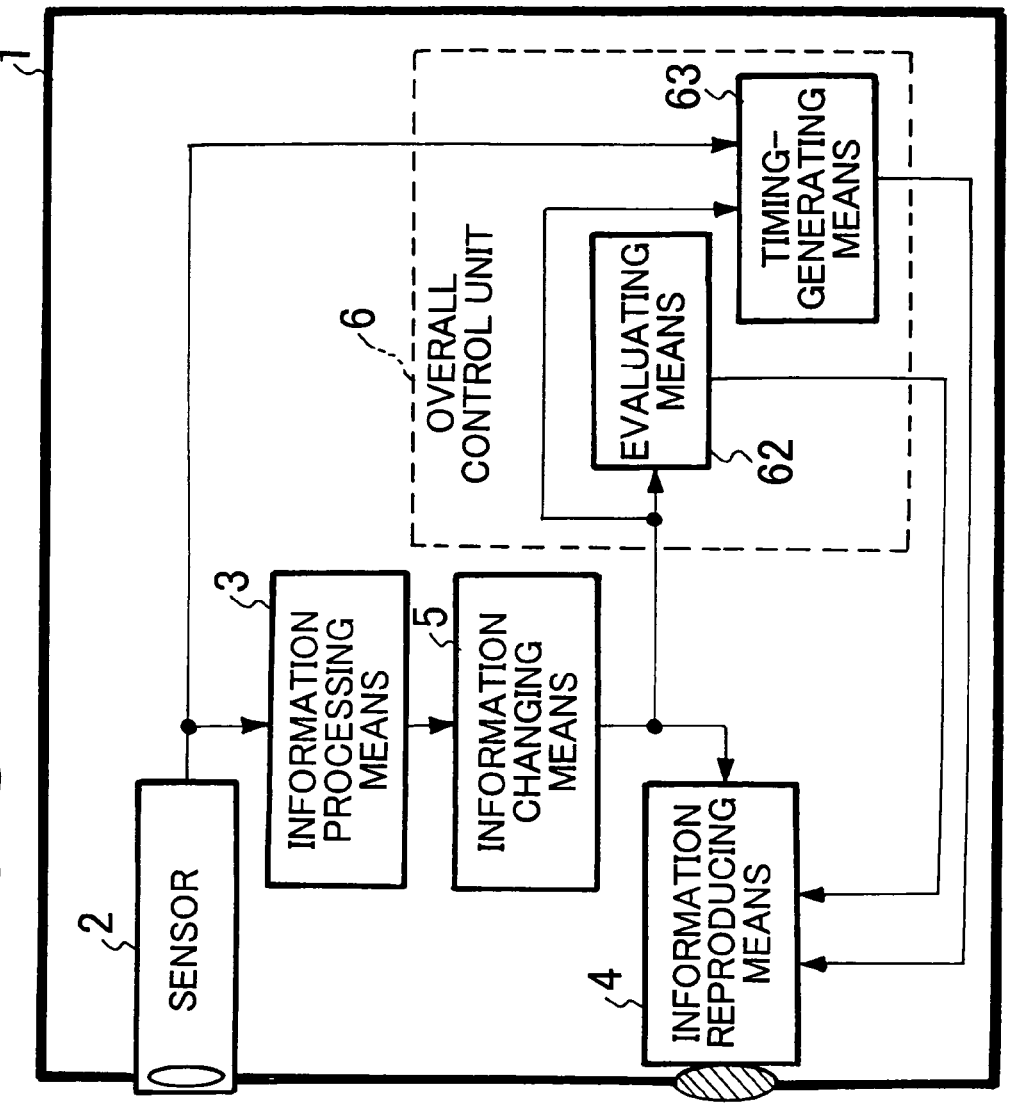
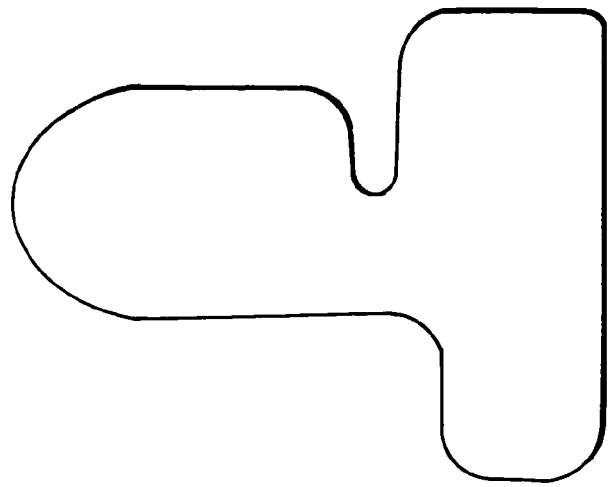

INFORMATION PROCESSING SYSTEM, WHICH ADDS INFORMATION TO TRANSLATION AND CONVERTS IT TO VOICE SIGNAL, AND METHOD OF PROCESSING INFORMATION FOR THE SAME

TECHNICAL FIELD

The present invention relates to an information processing system, a method of processing information, a program for processing information, and a robot. In particular, the invention relates to an information processing system, a method of processing information, a program for processing information, and a robot, wherein the above system, method, program and robot can add and delete information when transmitting the result of information processing.

BACKGROUND ART

Patent Document 1, Patent Document 2, Patent Document 3, Patent Document 4, Patent Document 5, Patent Document 6 and Patent Document 7 disclose conventional information processing systems designed to perform interpretation or translation.

The information processing system disclosed in Patent Document 1 comprises a voice recognition unit, a machine translation unit, a voice synthesis unit, a display unit, and an interactive managing unit. The information processing system thus configured and disclosed in Patent Document 1 operates as will be described below.

The voice recognition unit recognizes the voice inputted to it. The result of voice recognition is supplied to the machine translation unit. The machine translation unit performs machine translation on the result of voice recognition. If the result is not composed of data units fitted for machine translation, the machine translation unit instructs the voice recognition unit to change the data units. Then, the voice synthesis unit outputs voice.

The conventional information processing systems disclosed in Patent Documents 2 to 4, which are other examples of systems that are designed to perform interpretation or translation, have a voice recognition unit, a machine translation unit and a voice synthesis unit, as is disclosed in Patent Document 1. The conventional information processing systems disclosed in Patent Documents 1 to 4 are all designated to perform interpretation or translation. Their objective is to achieve highly-accurate and natural interpretation or translation.

In discussing the prior art, Patent Document 5 refers to a robot that performs preset motions in accordance with the user's instructions or the external conditions. The document discloses another robot that comprises a means for recognizing the external conditions and a means for generating emotion from internal conditions. This robot reflects emotional changes on the dialog.

Patent Document 6 describes a robot that controls characters or conditions displayed as images, in accordance with the information supplied from a voice recognition unit, a machine translation unit, a voice input unit or the like and representing the user's emotion. Patent Document 7 describes a robot that has a translation function, a foreign-language conversation function, a study function of determining whether the user's answers are correct, a pronunciation-evaluating function, and the like.

Patent Document 1: JP-A-2001-100784
Patent Document 2: JP-A-2001-100788
Patent Document 3: JP-A-2001-117921
Patent Document 4: JP-A-2001-117922
Patent Document 5: JP-A-2002-283261
Patent Document 6: JP-A-2001-117752
Patent Document 7: JP-A-2002-351305

DESCRIPTION OF INVENTION

Problems to be Solved by the Invention

Conventional techniques have been explained, with reference to Patent Documents 1 to 7. The techniques disclosed in these documents may be used in appropriate combination, thereby to perform interpretation or translation at high accuracy, and various motions in accordance with signals supplied from external or with the internal conditions. However, the conventional techniques have the following problem.

The problem is that the conventional systems exemplified above cannot reproduce anything other than the correct result of information processing. This is because they are configured to reproduce the result of information processing without modification, exactly as it is.

Accordingly, an object of the present invention is to provide an information processing system, a method of processing information, a program for processing information, and a robot, which can reproduce not only the result of information processing, but also information other than the result.

Means for Solving the Problem

An information processing system according to this invention comprises an information analysis unit that analyzes received information and determines additional information to be added to the received information or deletion information to be deleted from the received information, on the basis of result of analyzing the received information; a change processing unit that adds the additional information determined by the information analysis unit or deletes the deletion information determined by the information analysis unit, to or from the received information; and an information reproducing unit that reproduces information which has been changed by the change processing unit.

A robot according to this invention comprises an information analysis unit that analyzes received information and determines additional information to be added to the received information or deletion information to be deleted from the received information, on the basis of result of analyzing the received information;

a change processing unit that adds the additional information determined by the information analysis unit or deletes the deletion information determined by the information analysis unit, to or from the received information; and an information reproducing unit that reproduces information which has been changed.

An information processing system according to the present invention comprises an information processing device comprising an information analysis unit that analyzes received information and determines additional information to be added to the received information or deletion information to be deleted from the received information, on the basis of result of analyzing the received information, a change processing unit that adds the additional information determined by the information analysis unit or deletes the deletion information determined by the information analysis unit, to or from the received information, an information reproducing unit that reproduces information which the additional information has been added or the deletion information has been deleted, and a first communication means for transmitting a retrieval instruction for retrieving the additional information determined by the information analysis unit; and an information storing device comprising a second communication means for transmitting and receiving information to and from the first communication means, a memory unit that stores information to be usable as the additional information, and a retrieval unit that retrieves the additional information from the memory unit in accordance with the retrieval instruction, wherein the additional information retrieved from the information storing device is transmitted to the change processing unit through the second communication means and the first communication means.

A method of processing information, according to the present invention, comprises a first step of analyzing received information and determining additional information to be added to the received information or deletion information to be deleted from the received information, on the basis of result of analyzing the received information; and a second step of adding the additional information determined in the first step or deleting the deletion information determined in the first step, to or from the received information.

A method of processing information, according to the present invention, comprises a first step of analyzing received information and determining information to be added to the received information, on the basis of result of analyzing the received information;

a third step of transmitting an instruction for retrieving the added information;

a fourth step of retrieving the added information from a memory unit that stores information to be usable as the added information, in accordance with the instruction for retrieving the added information;

a fifth step of transmitting the added information retrieved;

a sixth step of adding the information to be added, to the received information; and a seventh step of reproducing the information to which the information to be added has been added.

A program for processing information, according to the present invention, is configured to cause a computer to perform:

a first process of analyzing received information and determining additional information to be added to the received information, or deletion information to be deleted from, the received information, on the basis of result of analyzing the received information; and a second process of adding the additional information determined in the first process or deleting the deletion information determined in the first process, to or from the received information.

Effect of the Invention

The present invention helps to achieve smooth communication. This is because it can transmit additional information, as well as the result of information processing. Further, the present invention can accomplish communication at high efficiency. This is because it can delete unnecessary information or redundant information from the result of information processing. Moreover, the present invention can enhance the quality of communication. This is because it can add appropriate detail information to the result of information processing.

BEST MODE FOR CARRYING OUT THE INVENTION

Embodiment 1

Best modes for carrying out the present invention will be described in detail, with reference to the accompanying drawings. As shown in FIG. 1, the first embodiment of this invention includes a sensor 2 that serves as an information input unit, an information processing means 3, an information changing means 5, and an information reproducing means 4. These means operate, generally as follows.

The sensor 2 as the information input unit receives information to be processed, such as signals supplied from outside. The sensor 2 can be configured to receive all signals such as electric waves, light, sound, temperature (thermography), contact stimulation, and any possible combination of these. As sensor 2, an acoustic transducer, for example, microphone, a CCD camera, and a keyboard can be exemplified. The information processing means 3 processes the information that the sensor 2 has received, and transmits the result of the information processing to the information reproducing means 4. The information processing may be interpretation that includes voice recognition, translation and voice synthesis. In this case, the information processing means 3 translates the first language received by the microphone or keyboard as sensor 2, into the second language. The information changing means 5 adds information to or delete information from, the result of the information processing performed by the information processing means 3. Then, the information is reproduced in the information reproducing means 4. The signal that the information reproducing means 4 reproduces includes sound, images (still pictures and moving pictures), and characters. The information reproducing means 4 may be a speaker or a display device such as a liquid crystal display.

FIG. 2 shows an example of the information processing means 3, which performs interpretation. This information processing means 3 comprises a control unit 31, a voice processing unit 32, and an automatic interpretation unit 33. The voice processing unit 32 includes a voice recognition unit 321 and a voice synthesis unit 322. The operation of the voice recognition unit is detailed in, for example, AkioAndo, "Real Time Speech Recognition," The Institute of Electronics, Information and Communication Engineers, September 2003 (Document A). The operation of the voice synthesis unit is detailed in, for example, Sadaoki Furui, "Digital Speech Processing," Tokai University Press, September 1985 (Document B)

The control unit 31 controls the operation of the entire system. It manages and controls the direction of translation between two languages, the flow of various information, the addresses of these information, and all other things. The voice recognition unit 321 recognizes the voice inputted to it, on the basis of the attributes of the voice. The voice synthesis unit 322 converts the output of the automatic interpretation unit 33 into voice. The automatic interpretation unit 33 receives the speech of a person from the voice recognition unit 321 and translates the speech to one in another language. The content of the speech sent from the voice recognition unit 321 is expressed in one of two languages. Thus, the automatic interpretation unit 33 has the function of performing interactive automatic interpretation.

FIG. 3 depicts another example of the information processing means 3, which operates to achieve multi-lingual interpretation. This information processing means 3 includes a control unit 31, a voice processing unit 32, and an automatic interpretation unit 33. The combination of the voice processing unit 32 and automatic interpretation unit 33 can deal with more languages than the languages subjected to interpretation.

The control unit 31 controls the operation of the entire system. It manages and controls the direction of translation between many languages, the flow of various information, the addresses of these information, the selection of an appropriate combination of the voice processing unit 32 and automatic interpretation unit 33, and all other things. The other operations of the information processing means 3 are identical to those explained with reference to FIG. 2.

FIG. 4 shows an example of the information changing means 5, which adds information. The information changing means 5 shown in FIG. 4 includes a change processing unit 51, an additional-information generating unit 52, and a control unit 53. The additional-information generating unit 52 includes an information analysis unit 521, a retrieval unit 522, and a memory 523.

The change processing unit 51 receives the result of information processing from the information processing means 3 and actually adds information. The additional-information generating unit 52 receives the result of information processing from the information processing means 3 via the change processing unit 51. The additional-information generating unit 52 then generates information that the change processing unit 51 will add. The control unit 53 controls the generation of additional information, which is performed in the additional-information generating unit 52, and the addition of information, which is carried out in the change-processing unit 51. The information analysis unit 521 analyzes the information, i.e., the result of information processing, which has been received from the information processing 3 via the retrieval unit 522. The information analysis unit 521 then determines which information should be added. The analysis is composed of a step of classifying the information supplied, a step of selecting a category for the additional information, and a step of selecting the additional information.

In the step of classifying the information supplied, the meaning of the information is interpreted and the information is classified as a question, an explanation, or the like. If the information supplied is a sentence such as "Is it . . . ?", "Whether . . . is questionable . . . " or the like, it is classified as a question. If it is a sentence such as "This point is explained as being . . . ," "It is considered to be . . . " or the like, it is classified as an explanation.

In the step of selecting a category for the additional information, a category of the additional information is selected, which is suitable as a question or an explanation. For example, an expression prompting an answer to a question can be added to a question, and an expression confirming understanding or communication can be added to an explanation. The expression prompting an answer is, for example, "Please respond to . . . ". The expression confirming under standing or communication is, for example, "Do you understand?" or "Do you hear it?".

In the step of selecting the additional information, one or more information are selected from those that belong to these categories. The information selected will be used as additional information. The information belonging to these categories have been stored into the memory 523. To select additional information, keywords may be extracted from the result of information processing and the information stored. The additional information can then be selected on the basis of the relation between the keywords thus extracted. To this end, the additional information which are stored into the memory 523 should be classified keyword by keyword. If there is a plurality of additional information that can be identified by keyword, they can be used in the order they are stored in the memory 523 or in the reverse order. Further, additional information used in the past can be used again after some time from time that they were used. Moreover, random additional information may be added to the keywords extracted from the result of information processing. In this case, random numbers are generated, and additional information items that correspond to the random numbers are selected. Random words may induce unpredictable friendly reactions. In view of this, the additional information brings forth a great advantage.

In other classification, the result of information may be classified into a rapid conversation that consists mainly of short phrases and sentences, and a relatively formal conversation that consists of long sentences, through the analysis of the past result of information processing and the additional information. In the step of selecting the category for the additional information for a rapid conversation, short phrases such as shouts and interjected chants may be used as additional information because they do not disturb conversation. In the step of selecting the category for the additional information for a formal conversation, long phrases and sentences may be used as additional information. "Way to go, man!" and "Bravo!" are examples of shouts and interjected chants.

The time interval from the transmission of the result of information processing to the information reproducing apparatus, to the acquisition of the result of the next information processing may be evaluated, thereby to estimate the understanding of the other party. When the time interval is evaluated, it may be determined that the response of the other party is delayed. If this is the case, an expression prompting an answer or an expression of agreement can be added. Example of an expression of agreement are "Exactly,", "You bet!" or "You got it!", "I see." and "I agree.".

Phrases expressing encouragement or consolation may be added for a person who feels something upon hearing the interpretation result. In this case, the reaction to the information supplied is analyzed in the step of classifying the information. The reaction is then classified in order to select a category for the additional information. If the reaction is classified to one indicating, for example, a sorrow or a joy, the category of consolation or sympathy is selected.

The retrieval unit 522 retrieves from the memory 523 the additional information determined by the information analysis unit 521. The memory 523 has stored information that may be used as additional information.

The additional information that the retrieval unit 522 has retrieved is supplied to the change processing unit 51. Examples of the information stored in the memory are expressions showing interpretation or translation, expressions prompting an answer, expressions indicating understanding or communication, shouts, interjected chants, expressions of agreement, and the like. Among the expressions showing that the statement is an interpreted or translated one are "so he says", "he is asking you . . . . What would you do?", "he is asking about . . . ", and so on.

If the information reproducing means 4 is a display device or a robot, information other than the linguistic information explained thus far can be added. Examples of such information are those that represent motions, colors and light. If a display device is displaying an agent or a robot is used, the motion of the agent or robot makes will be the additional information. The agent or the robot can make not only motions that man usually does, such as nodding, leaning of head, wagging of head and jumping, but also motions that man would never make. Examples of the special motions of the agent or robot can make are the expansion and contraction of body and separation of body. Further, the agent can make its copies in large or small numbers. In the robot, parts of body, which move to make motions, are the arms, the hands, the legs, the trunk, the head, the face, and the like.

Color is used as additional information in the case where the agent or the robot needs to change in color. For example, the color of the agent may be changed, or the light emitted from the built-in luminous bodies of varied positions of the agent or robot may be changed in color. As such luminous bodies, LEDs can be used, in addition to electric bulbs of ordinary type. If a plurality of luminous bodies are controlled in complex combinations, the agent or the robot can look as if it were expressing its emotion. This enhances the advantage of using the additional information in the present invention.

Another example of using light as additional information is a control of a blinking pattern or intensity of light. If the luminous bodies are controlled to blink in a specific pattern or to emit light of various intensities, the same advantage will be attained as in the case where the color is changed as described above.

FIG. 5 shows another embodiment of the invention, in which the information changing means 5 operates to add information. The additional-information generating unit 52 shown in FIG. 5 includes a communication means 524 that is used in place of the memory 523 shown in FIG. 4. It further includes an additional-information storage unit 54. That is, the additional-information generating unit 52 acquires the additional information from the additional-information storage unit 54 via the communication means 524, in place of the information added by the change processing unit 51 and stored into the memory 523. The additional-information storage unit 54 includes a communication-processing unit 541, a retrieval unit 542, memory 543, and a control unit 544.

The communication means 541 is paired with, and communicates with, the communication means 524. The communication means 541 receives the information that the retrieval unit 522 should retrieve. The information to be retrieved, which the communication means 541 has received, is transmitted to the retrieve unit 542. The retrieval unit 542 retrieves necessary information from the memory 543 and transmits it to the retrieval unit 522 via the communication means 541 and the communication means 524. This sequence of operations is controlled by the control unit 544 and the control unit 53.

The memory 543 previously stores information that may be used as additional information. The method and means that the communication means 541 and the communication means 524 employ to exchange information about retrieval can be any means available, such as wired (cable) transmission, wireless (radio) transmission including wireless LAN, and IP communication via the Internet.

The additional-information storage unit 54 may be a server that is connected via the Internet. Assume that the result of interpretation concerns with, for example, the weather for tomorrow, the weather forecast retrieved via the Internet may be added to the result of interpretation. Then, the information processed can be increased in quality.

The embodiment in which the information changing means 5 adds information has been described with reference to FIGS. 4 and 5. An embodiment, in which the information changing means 5 operates to delete information, can be similarly constructed, too. At first, in FIGS. 4 and 5, the additional-information generating unit and the additional-information storage unit are replaced by an information deleting unit and a deleted-information storage unit, respectively. The information analysis unit analyzes the information supplied to it and determines which information should be deleted, not which information should be added.

The information processing system according to the present embodiment is implemented in the form of a portable device such as a personal digital assistant (PDA), a personal computer or a cellular telephone. Its components are arranged and combined into a single terminal that is portable. The user can therefore use the system anywhere to make smooth communication with people.

In the present embodiment, the information changing means 5 adds information to, or delete information from, the result of information processing, which has been obtained in the information processing means 3, as has been described above. Hence, an added value such as emotional expression or detailed information can add to the result of information processing performed correctly. This helps to accomplish smooth communication.

The information processing means may perform interpretation or translation. In this case, phrases appropriate to the result of interpretation or translation is added. These phrases make the communicating partner feel congenial with the user. This contributes to smooth communication. Alternatively, it is possible to increase the quality of communication by appropriately summarizing the result of interpretation or translation or by adding detailed information.

Embodiment 2

This embodiment is identical to Embodiment 1, except that the construction is functionally divided into a terminal 21 and a server 40, which are connected by a communication path 80.

As shown in FIG. 6, Embodiment 2 of the present invention includes a terminal 21, a server 40, and a communication path 80. The terminal 21 includes a sensor 2, a communication means 211, an information changing means 5, and an information reproducing means 4. The server 40 includes an information processing means 3, an information changing means 401, and a communication means 402. The operations of the sensor 2, information processing means 3 and information reproducing means 4 are the same operations that have been already described. The information changing means 205 and 401 operate in the same way as the information changing means 5. These means operate, generally as will be explained below.

The sensor 2 receives information to be processed, such as signals supplied from out side. The communication means 211 supplies the information received at the sensor 2, to the communication means 402 through the communication path 80. The communication means 402 supplies the information received at the sensor 2 to the information processing means 3 through the communication means 211. The information processing means 3 processes the information received at the sensor 2. The information processed is supplied to the information changing means 401. The information changing means 401 adds information to, or deletes information from, the result of information processing, which has been obtained by the information processing means 3. The information changing means 401 then transmits the resulting information to the communication means 402.

The communication means 402 again transmits the result of information processing, which has been changed, to the communication means 211 via the communication path 80. The communication means 211 transmits the result of processing, which it has received via the communication means 402, to the information changing means 205. The information changing means 205 adds information to, or deletes information from, the result of processing, which it has received through the communication means 402, and transmits the resulting information to the information reproducing means 4.

In the sequence of processes, described above, the information changing means 401 and the information changing means 205 deletes or adds information. Nonetheless, one of the information changing means 401 and information changing means 205 may be configured to delete or add information. For example, the additional-information generating unit 52 that is shown in FIG. 4 may be set into the information changing means 401, and the change-processing unit 51 that supplies the additional information that has been generated by the additional-information generating unit 52 may be set into the information changing means 205.

The terminal 21 is implemented as a portable device such as a personal digital assistant (PDA), a personal computer or a cellular telephone. No restriction is imposed on the implementation of the server 40. The communication path 80 can be any means available, such as wired (cable) transmission, wireless (radio) transmission including wireless LAN, and IP communication via the Internet.

The process that the terminal 21 and server 40 perform may be interpretation. In this case, the sensor 2, information processing means 3 and information reproducing means 4 can be assigned to voice recognition, translation and voice synthesis. For example, the information processing means 3 may perform voice recognition and translation and the information reproducing means 4 may perform voice synthesis. If so, the information transmitted from the terminal 21 to the server 40 via the communication path 80 is audio information, whereas the information transmitted from the server to the terminal 21 is the result of translation.

The sensor 2 may extract feature quantity of the audio information, such as cepstrum, the information processing means 3 may carry out voice recognition, translation and generation of phoneme information, and the information reproducing means 4 may synthesize from the phonemes into voice. In this case, the information transmitted from the terminal 21 to the server 40 via the communication path 80 represents the feature quantity of voice and the information transmitted from the server to the terminal 21 is phoneme information.

Thus, the sensor 2, information processing means 3 and information reproducing means 4 can be assigned to the parts of information processing.

The method and means that enable the communication means 211 and the communication means 402 to exchange information can be any means available, such as wired transmission, wireless transmission including wireless LAN, and IP communication via the Internet.

In FIG. 6, one terminal 21 and one server 40 are illustrated. Nevertheless, one terminal and a plurality of severs maybe connected by a network, a plurality of terminals and one server may be connected by a network or a plurality of terminals and a plurality of servers may be corrected by a network. The network can be any means available, such as cable transmission, wireless transmission including wireless LAN, and IP communication via the Internet.

If a plurality of servers are connected to one terminal by a network, the information from the sensor is supplied to the servers via the communication means, and the terminal can receive almost the same result of processing from the servers. In the terminal, the results of processing, received from the servers, are compared. The most appropriate result of processing can therefore be selected. Alternatively, the results of processing, supplied from the servers, may be combined in an appropriate manner, thereby to generate a better result of processing. Servers can be provided in any number desired. Consider an embodiment that uses,for example,one terminal and ten servers. In this embodiment, ten similar results that the ten servers have generated are supplied to the terminal.

If the servers perform voice recognition or interpretation, the selection or combination means provided in the terminal compares the ten results of voice recognition or interpretation and selects the majority prominent result as result that should be transmitted to the information changing means.

In the present embodiment, the information changing means 401 and the information changing means 205 are configured to add information to, or delete information from, the result of processing, obtained in the information processing means 3. A value such as emotional expression or detailed information can therefore be added to the result of the processing that has been correctly carried out. This helps to accomplish smooth communication. Moreover, in the present embodiment, the sever 40 is assigned to a process that includes many operations, and the terminal 21 is assigned to a small-scale process and interface operations. The processing can therefore be performed at high efficiency in order to achieve smooth communication.

In the present embodiment, one or more terminals compare the results of processing, obtained by a plurality of servers, and then select the most appropriate result or combine some results to generate an appropriate result. Hence, the embodiment can achieve smooth high-quality communication.

Embodiment 3

In this embodiment, software implements the functions of the information processing means 3 and information changing means 5. As shown in FIG. 7, Embodiment 3 includes a computer (i.e., central processing unit, processor, and data-processing device) 200, a sensor 2,and an information reproducing means 4. The computer (i.e., central processing unit, processor, and information processing device) 900 includes the information processing means 3, and the information changing means 5. The computer 900 is composed of, for example, a CPU that performs operations, a memory unit (e.g., ROM) that stores programs to be executed to perform the functions of the information processing means 3 and information changing means 5, and another memory unit (e.g., RAM) that stores the information supplied from the sensor 2 or the information resulting from the operations. The computer is configured in the form of, for example, a one-chip computer. These means operate, generally as will be described below.

The sensor 2 receives information to be processed, such as signals supplied from outside. The information processing means 3 processes the information received at the sensor 2. The information processed is supplied to the information reproducing means 4. The information changing means 5 adds information to, or delete information from, the result of information processing, which has been obtained in the information processing means 3. The information reproducing means 4 reproduces the result of processing, to or from which the information changing means 5 has added or deleted information.

FIG. 8 depicts another configuration in which software implements the functions of the information processing means 3 and information changing means 5. As shown in FIG. 8, the main program (i.e., information processing program) is read into the computer (central processing unit, processor, data processing device) 910 and controls the operation of the computer 910. The computer 910 is composed of, for example, a CPU that performs operations, a memory unit (e.g., disk drive such as a hard disk drive) that stores programs to be executed to perform the functions of the information processing means 3 and information changing means 5, and another memory unit (e.g., RAM) that stores the information supplied from the sensor 2 or the information resulting from the operations. The programs to be executed to perform the functions of the information processing means 3 and information changing means 5 are installed as needed. Thus, the software can be updated. Controlled by the programs, the computer 910 performs a processing that is similar to the processing that the computer 900 performs as has been explained with reference to FIG. 7.

In the present embodiment, information changing means 5 adds information to, or delete information from, the result of information processing, which has been obtained in the information processing means 3. A value such as emotional expression or detailed information can therefore be added to the result of the processing that has been correctly carried out. This helps to accomplish smooth communication.

Embodiment 4

A robot that uses the information processing system described with reference to FIGS. 1 to 5 will be explained. As shown in FIG. 9, the second embodiment of this invention includes a robot body 1, a sensor 2, an information processing means 3, an information changing means 5, an information reproducing means 4, an overall control unit 6, a motion-controlling means 7, a direction-inputting means 10, and a transmitting means 11. The overall control unit 6 includes an evaluating means 62 and a timing-generating means 63. The motion-controlling means 7 includes a motor 71 and a memory 72. The motor 71 is provided to rotate the robot body 1 and moves the same up and down. The robot may have arms and legs, looking like a man, may be shaped like an animal such as a dog or a cat, may have a display device, a microphone and a speaker, looking like a machine, or may be provided in other various forms. These means operate, generally as will be described below.

The sensor 2, the information processing means 3, the information reproducing means 4, and the information changing mans 5 operate in the same manner as has been explained. The overall control unit 6 uses an evaluating means 62, evaluating the result of processing, which has been obtained in the information changing means 5, and transmits a control signal based on the result of evaluation, to the motion-controlling means 7. The overall control unit 6 uses a timing-generating means 63, generating a timing signal representing the timing of operating the motion-controlling means 7. The timing signal is based on the result of processing, changed by the information changing means 5, and the output of the sensor 2. The overall control unit 6 may use the evaluating means 62, evaluating the result of processing, obtained in the information processing means 3, and may transmit a control signal based on the result of evaluation, to the motion-controlling means 7.

As illustrated in FIG. 9, the evaluating means 62 may evaluate the result of changing the information, obtained by the information changing means 5, when the information changing means 5 operates and adds, for example, a joke much related to the result of interpretation. In this case, the evaluating means 62 generates a control signal that corresponds to the content of that joke. For instance, the motion-controlling means 7 can generate a signal that causes the robot body 1 to turn to the left and the right, as if responding to the joke. Further, the motion-controlling means 7 can generate a signal that causes the robot to make a gesture in response to the information reproduced by the information reproducing means 4, if the robot can make complex movements.

On the other hand, the evaluating means 62 may evaluate the result of processing, obtained in the information processing means 3 which has performed, for example, interpretation. In this case, the evaluating means 61 evaluates the result of the interpretation and generates a control signal corresponding to the content of interpretation. Assume that the result of interpretation contains a "laugh." Then, the motion controlling means 7 can generate a signal that causes the robot body 1 to move up and down, or from right to left twitchily. Such a motion is similar to the motion the man makes when laughing. Thus, the robot can express a friendly character.

Usually, the evaluating means 62 gives the motion-controlling means 7 one control signal upon evaluating the result of processing, obtained by the information changing means 5, and another signal upon evaluating the result of processing, obtained by the information processing means 3. For example, even if the result of interpretation contains a "laugh," the evaluating means 62 generates no signals that cause the motion controlling means 7 to make the robot body 1 move up and down, or from right to left twitchily, once the information changing means 5 has deleted the "laugh" from the result of interpretation.

The motion controlling means 7 receives a control signal from the evaluating means 61 at the timing represented by the signal transmitted from the timing generating means 63 incorporated in the overall control unit 6. The motion controlling means 7 converts the control signal to a signal for controlling the motor that actually moves the robot body 1. The signal is transmitted to the motor 71. The motor 71 generates a rotation or an up-and-down movement in accordance with the control signal thus supplied.

The timing generating means 63 can generate timing signal from all information input to it. The input information includes acoustic information, video information, touch information, and the like. The acoustic information may represent the voice intensity, the direction in which voice is coming, the kind of language, words, combinations of words, address, name, personal data, and the like. Moreover, the acoustic information includes data about the changes in these items, such as a change in voice intensity and a change from one language to another. These information items can be stored in the memory in advance. The motion controlling means 7 doesn't necessarily need a timing generating means, if the operation timing of the control signal transmitted from the evaluating means 62 is not controversial.

In the present embodiment, the timing generating means 63 generates a timing signal on the basis of the output of the sensor 2 and the output of the information changing means 5. Instead, the means 63 may generate a timing signal when sensors detect external stimuli such as electric waves, light and sound. If this is the case, means for transmitting the external stimuli, such as electric waves, light and sound, are provided outside, and the external stimuli are received by an electric-wave receiver, a photoelectric transducer, a microphone and the like, which generate timing signals. These transmission means may be a remote controller, a personal digital assistant (PDA), a personal computer (PC) and a cellular telephone. If the sensor that detects an external stimulus is a touch sensor, timing information can be transmitted when something contacts the touch sensor. A keyboard and a voice recognition device may be used as sensors that detect external stimuli. If so, the meaning of the information input at the keyboard, the result of recognition, and the timing of generating an input can be used as timing information that should be input. With this configuration, the motion can be controlled in accordance with any timing input from outside. Hence, smooth communication can be accomplished, through various expressions.

Note that the motion controlling means 7 can have a plurality of motors. In this case, the motion controlling means 7 can realize complex motions, each being a combination of rotations around many axes. The motion controlling means 7 may be mechanically more complicated and may therefore control more complex motions.

The motion controlling means 7 controls motions by using the information transmitted from the direction inputting means 10, as well as the control signal and the timing information that the evaluating means 62 and the timing generating means 63 have respectively generated. For example, the evaluating means 62 detects the information about the language, which is contained in the output of the information changing means 5. The motion controlling means 7 makes the robot to turn to a listener, by using the information about the language and the direction information input from the direction inputting means 10 and concerning the listener listening to what is spoken in that language. The direction inputting means 10 receives the direction information about both the speaker and the listener and transmits to the motion controlling means 7 a control signal that corresponds to the direction information. The input to the direction inputting means 10 may be electric waves, light, sound, or the like. If the direction inputting means 10 is a touch sensor, the direction information can be input in the form of a contact stimulus or a combination of contact stimuli. Like the information stored in the memory 73, the direction information that the direction inputting means 10 receives can be expanded in number of items if multi-lingual interpretation is performed and there are many speakers and many listeners.

The transmitting means 11 generates direction information, which the direction inputting means 10 will receive. The transmitting means 11 and the direction input means 10 are configured to handle the same information (i.e., stimulus). The transmitting means 11 is, for example, a remote controller, a PDA, a PC or a cellular telephone. The transmitting means 11 may be eliminated.

Likewise, the input to the information processing means 3 may be supplied to the evaluating means 62, instead of the output from the information changing means 5, and the information about the language is detected. Then, the motion controlling means 7 can perform a control, making the robot turn to the speaker. Further, the motion controlling means 7 can make the speaker turn to the listener immediately after it has stopped speaking, if the timing generating means 63 detects the end of the speaker's speech.

The relation between the control signal supplied from the evaluating means 61 and the specific operation of the motion controlling means 7 can be preset. The specific operation includes the operation per se and the timing of the operation. This relation is stored in the memory beforehand. Upon receiving the control signal from the evaluating means 61, the motion controlling means 7 refers to the content of the memory 72 and converts the control signal to a signal that controls the motor 71.

The motion controlling means 7 may have another memory in addition to the memory 72. The other memory stores the information about the direction in which a subject speaking the first language to be interpreted exists and the direction in which another subject speaking the second language into which the first language is interpreted exists. The other memory can therefore function as the direction inputting means. Hereinafter, the subject who speaks the first language will be called speaker, while the subject who receives the second language will be called listener. The speaker and the listener include inanimate objects such as robots. If multi-lingual interpretation is performed and there are many speakers and many listeners, the information about the direction in which the other memory stores data is expanded in accordance with how many languages are used and how many speakers and listeners involve.

The motion controlling means 7 controls the motions by using the information stored in the other memory, as well as the control signal and the timing information that the evaluating means 62 and the timing generating means 63 have respectively generated. For example, the evaluating means 62 detects the information about the language, which is contained in the output of the information changing means 5. The motion controlling means 7 makes the robot to turn to a listener, by using the information about the language and the direction information stored in the other memory and concerning the listener listening to what is spoken in that language.

Likewise, the input to the information processing means 3 may be supplied to the evaluating means 62, instead of the output from the information changing means 5, and the information about the language is detected. Then, the motion controlling means 7 can perform a control, making the robot turn to the speaker. Moreover, the motion controlling means 7 can make the speaker turn to the listener right after it has stopped speaking, if the timing generating means 63 detects the end of the speaker's speech.

If the direction information is stored and used to control the motion, smooth communication can be accomplished, through various expressions.

In the present embodiment, information changing means 5 adds information to, or delete information from, the result of processing, which has been obtained by the information processing means 3. A value such as emotional expression or detailed information can therefore be added to the result of the processing that has been correctly carried out. This helps to accomplish smooth communication. Furthermore, the present embodiment can accomplish smooth communication through various expressions, because the motion is controlled in accordance with the result of processing or the information that has been changed. Still further, since a pattern of motion is stored, various expressions can be represented by processing a small amount of calculation.

In the present embodiment, the motion is controlled in accordance with the timing when the input and the result of processing are obtained. The embodiment can therefore accomplish smooth communication through various expressions. Since any direction information can be input from outside, smooth communication through various expressions can be performed. Further, since information of a specific format can be transmitted in this embodiment when the direction information is input from outside, smooth communication through various expressions can be carried out.

Embodiment 5

This embodiment is a robot of another configuration.

As is illustrated in FIG. 10, Embodiment 5 includes a sensor 2, an information processing means 3, an information changing means 5, an information reproducing means 4, an overall control unit 6, an motion-controlling means 7, a sensor 12, a direction-identifying means 13, a transmitting means 14, and a sensor 15. The overall control unit 6 includes an evaluating means 62, a timing generating means 64, and an analyzing means 66. The motion controlling means 7 includes motors 71 and 171 and wheels 18 and 19. The direction identifying means 13 includes a selecting means 131, an identifying means 132, and a repeating control means 133. These means operate, generally as will be described below.

The sensor 2, the information processing means 3, the information reproducing means 4, the information changing mans 5, the evaluating means 62, timing-generating means 63, and the motor 71 operate in the same manner as has been explained.

The sensor 12 receives information about the direction of the speaker and the listener and supplies this information to the direction identifying means 13. The direction identifying means 13 uses the information received from the sensor 12, thus identifying the directions in which the speaker and listener exist, and transmits to the motion controlling means 7 a control signal that corresponds to the directions identified. If multi-lingual interpretation is performed and there are many speakers and many listeners, the directions identified by the direction identifying means 13 can be expanded to a plurality of directions in accordance with how many languages are used and how many speakers and listeners exist.

Assume that the information about the direction of the speaker and listener, which the sensor 12 has received, is audio information. Then, the sensor 12 is a plurality of acoustic transducer. The present embodiment will be described, on the assumption that the sensor 12 is a plurality of microphones because the microphone is a representative example of an acoustic transducer. As is known in the art, the direction in which an acoustic signal comes can be identified by using the phase difference between the signals that the microphones receive.

Ohga, Yamazaki, Kaneda, "Acoustic Systems and Digital Processing," The Institute of Electronics, Information and Communication Engineers, September 1995 (Document C) discloses a plurality of microphones that are arranged in a straight line. No phase difference exits between the signals received by the microphones and coming in directions at right angles to the straight line connecting the microphones. On the other hand, signals coming in any directions other than the directions at right angles to the straight line have phase difference between them. This is because the signals reach the microphones at different times.

This phase difference, i.e., time difference, is uniquely determined by the sonic speed, the interval between the microphones and the angle between the signal-coming direction and the straight line connecting the microphones. Hence, the direction in which the signal comes can be identified by evaluating the phase difference between the signals that the microphones have received. This means that the direction of the speaker can be identified by using the speaker's speech.

The relation between the speaker and the listener repeatedly changes in the scenario of interpretation. Thus, once the direction of the speaker is identified at a certain time, the direction of the listener can be identified when the listener becomes a speaker, speaking in the second language.

Assume that the information about the direction of the speaker and listener, which the sensor 12 has received, is video information. In this case, the sensor 12 is a plurality of cameras. As is known in the art, the direction of the speaker can be identified by performing personal identification on the speaker. Namely, the images obtained by the sensors 12 are examined, and if these images include one showing the speaker, the direction corresponding to the image is regarded as the direction of the speaker.

Generally, it is difficult to determine whether the person detected is the speaker or the listener, from the video information only. It is therefore necessary to detect the direction from audio signals or to analyze the motion of the lips, thereby to identify the speaker. Details of the person recognition are described in, for example, JP-A-2002-56388 (Document D). The face, the eyes, or the lips may be detected in order to recognize or identify the person, instead of detecting the person.

The sensor 12 can be configured to receive all signals represented by electric waves, light, sound, temperature (thermography), contact stimulation, or any possible combination of these. As sensor 12, a keyboard or a voice recognition device can be exemplified as has been explained.

The direction identifying means 13 may receive not only the output of the sensor 12, but also the timing control signal generated by the timing-generating means 63 as input. The timing generating means 63 can control the timing of identifying the direction from the information received by the sensor 12, by using the signal received from the timing-generating means 64. If this is the case, the direction can be identified at the timing that the input and the result of processing are obtained. Thus, smooth communication can be accomplished on the basis of the more accurate result of identifying the direction.

The overall control unit 6 may control the timing generating means 64, causing the same to generate the timing at which the motion controlling means 7 operates, by using the result of processing obtained by the information changing means 5 and the inputs obtained from the sensor 2 and sensor 12. In particular, if the sensor 12 receives video information, the timing generating means 64 uses both the audio information it has received from the sensor 2 and the video information it has received from the sensor 12, and generates, at high accuracy, the timing of operating the motion controlling means 7. Since the timing of operating the motion controlling means 7 reflects the timing at which the result of processing and the information about the direction are obtained, smooth communication through various expressions can be accomplished.

The transmitting means 14 transmits a specific signal. The sensor 12 detects the reflection signal generated at the speaker and contained in the signal transmitted from the transmitting means 14. The direction identifying means 13 analyzes the reflection signal supplied from the sensor 12 and detects the direction of the speaker and listener. The signal that the transmitting means 14 transmits may be electric waves, light, sound, or the like. Of these examples, the most readily usable is ultrasonic waves. Since the direction is identified and the timing is generated on the basis of the reaction to the specific information thus transmitted, smooth communication through various expressions can be carried out. The transmitting means 14 may be eliminated.

The direction identifying means 13 includes the selecting means 131, the identifying means 132 and the repeating control means 133. The selecting means 131 and the repeating control means 133 may be eliminated.

If the selecting means 131 and the identifying means 132 are provided as in this embodiment, the transmitting means 14 transmits the specific signal to a limited region. The sensor 11 detects the reflection signal generated at the speaker and contained in the signal transmitted from the transmitting means 14. The direction identifying means 13 includes the selecting means 131 and the identifying means 132. The selecting means 131 selects only the reflection signal included in the signals received by the sensor 12, which corresponds to the region to which the transmitting means 14 should transmit the specific signal. Using the reflection signal thus selected, the identifying means 132 identifies the direction of the speaker.

The sensor 12 receives a signal transmitted from the transmitting means 14 and reflected, in the embodiment described above. Even if the sensor 12 receives information not related to reflection, the direction of the speaker can be identified on the basis of the same principle as described above, as the selecting means 131 selects a reflection signal and the identifying means 132 identifies the direction of the speaker from the reflection signal selected.

If constituted by the selecting means 131 and the identifying means 132, the direction identifying means 13 can further limit the region in which information is received to identify the direction. Therefore, smooth communication can be achieved on the basis of the more accurate result of identifying the direction.

The repeating control means 133 incorporated in the direction identifying means 13 repeatedly identifies the direction of the speaker with respect to a plurality of regions, by using the signal received by the sensor 12, selected by the selecting means 131 and identified by the identifying means 132. In this embodiment, the identifying means 132 is repeatedly operated to process information received from another region. Instead, a plurality of identifying means may be used, and appropriate signals may be distributed to these identifying means. Therefore, the directions of the speakers existing in the regions can therefore be identified. Hence, a speaker whose direction is not known at all can be detected by finding a person in a particular region, and a plurality of speakers can be detected. The repeating control means 133 may be eliminated.

If the sensor 12 receives video information, it is possible to detect the speaker and the direction of the speaker and to acquire information representing the direction of a listener by using the information representing the direction of the speaker. This is because the speaker usually faces the listener while speaking to the listener. The direction of the speaker can be determined by detecting the direction of the speaker's body or the direction of one's eyes, from video information. The direction to which the speaker turns is converted, if detected, to a direction of the speaker as viewed from the sensor 12, by using the direction information of the speaker. The direction information thus obtained is used in combination with the information about the direction of the listener. The direction of the listener can therefore be identified more accurately than otherwise. The information obtained by converting the orientation of the speaker may of course be used as one representing the direction of the listener if it is sufficiently accurate.

Moreover, audio information can be used in this sequence of operations. If this is the case, the sensor 12 must be of the type that can receive both video information and audio information, and direction identifying means 13 must have a function of processing audio information. The audio information can be the start/end of a speech, a switching of languages, personal voice characteristics, or the like. That is, the function of processing audio information includes voice detection, language identification and personal identification based on voice.

In the present embodiment, the region in which to receive the information for identifying the direction is limited. This limited region is changed, thus repeating the identification of direction. Therefore, the identification of direction can be not only accurate, but also be applied to a plurality of speakers/listeners. Smooth communication can therefore be accomplished.

A sensor 15 receives information about the distance between the robot and the speaker and the distance between the robot and the listener and transmits this information to the analyzing means 66. The analyzing means 66 evaluates the information transmitted from the sensor 15, finds these distances and the listener and transmits the distance information to a motion controlling means 17. The motion controlling means 17 controls the wheels 18 and 19, thus moving the robot. The distances between the robot and the speaker and the distance between the robot and the listener is thereby adjusted.

More specifically, if the information transmitted from the analyzing means 66 represents distances that are shorter than a predetermined distance, the wheels 18 and 19 are controlled, thereby making the robot body approach the speaker or the listener. Conversely, the information transmitted from the analyzing means 66 may represent distances that are longer than the predetermined distance. If so, the wheels 18 and 19 are controlled, making the robot approach the speaker or the listener. The sensor 15, analyzing means 66 and wheels 18 and 19 may be eliminated.

In the embodiment of FIG. 10, the motion controlling means 16 is configured to control the wheels 18 and 19. The wheels can be provided in any desired number. In this embodiment, the robot-moving means is constituted by the wheels 18 and 19. Nonetheless, the robot-moving means may be constituted by components other than wheels. Caterpillars or a multi-leg walking mechanism can be employed for the robot-moving means.

The sensor 15 is, for example, an ultrasonic-wave sensor. The sensor 15 may be an image sensor that includes an imaging element and the analyzing means 66 may be an image-recognizing means. Thus, it is possible to adjust the distance between the robot and the speaker and the distance between the robot and the listener based on images. In this case, use can be made of various information items representing the face (size of the face), the eyes (their relative positions or the distance between them), or the lips (their relative positions), as has been explained in conjunction with the sensor 12.

The sensor 15 may be a plurality of acoustic transducers and the analyzing means 66 may be configured to detect the direction of a sound source. Then, the distance between the robot and the speaker and the distance between the robot and the listener can be adjusted, using the principle of trigonometrical survey. Otherwise, the intensity of sound or light may be utilized.

The distance between the robot and the speaker and the distance between the robot and the listener can be controlled in accordance with the information supplied from outside. Smooth communication through various expressions can therefore be accomplished.

The sensor 2 may be removed from the robot body 1 and provided in a terminal, a communication means may be provided in each of the robot body and the terminal, and the sensor output may be transmitted from the terminal to the robot body via a communication path. In this configuration, the terminal having the sensor 2 can be moved independently of the robot. The sensor 2 can be positioned near a signal source. When the sensor 2 receives audio information, noise mixing into the signal can be relatively small because the sensor 2 is positioned near the mouth, i.e., the signal source. Therefore, the signal subjected to identifying process has a high signal-to-noise ratio, which leads to the improvement of the recognition ratio. This serves to achieve smooth communication in high quality.

As in the embodiment shown in FIG. 6, the sensor 2, information processing means 3 and information reproducing means 4 can be assigned to the parts of information processing. A plurality of robots may be provided in the terminal that has the sensor 2. The terminal can then make the robots perform the processing in the same manner. Thus, appropriate robots can be selected and operated in accordance with the languages used and the nature of the information received by the sensor 2. Since the terminal 24 make appropriate communication with the robots, making them perform parts of the information processing, respectively, smooth, high-quality communication can be accomplished.

The sensor 2, information processing means 3 and information reproducing means 4 can be appropriately assigned to the parts of information processing, in the same way as in the embodiment explained with reference to FIG. 6.

As has been described, the information changing means 5 used in this embodiment is configured to add information to, or delete information from, the result of information processing, which has been obtained by the information processing means 3. A value such as emotional expression or detailed information can therefore be added to the result of the processing that has been correctly carried out. This helps to accomplish smooth communication. In addition, the present embodiment is configured to calculate automatically the direction information from the information input from outside. Thus, smooth communication through various expressions can be accomplished.

Embodiment 6

This embodiment is another configuration of a robot.

As shown in FIG. 11, this embodiment includes a terminal 24, a server 40, a robot 25, and communication paths 85 and 87. The terminal 24 includes a sensor 2 and a communication means 211. The robot 25 includes a communication means 70 and an information reproducing means 4. These means operate, generally as will be described below.

The sensor 2 receives information to be processed, such as signals supplied from outside. The communication means 211 transmits the information that the sensor 2 has received, to a communication means 402 through the communication path 85. The communication means 402 transmits the information received at the sensor 2 from the communication means 211 through the communication path 85, to the information processing means 3. The information processing means 3 processes the information received at the sensor 2, and transmits the information to an information changing means 401.

The information changing means 401 adds information to, or deletes information from, the result of information processing, which has been obtained by the information processing means 3, and transmits the resulting information to the communication means 402. The communication means 402 transmits the result of processing to the communication means 70 through the communication path 87. The communication means 70 transmits the information received via the communication means 402, to the information reproducing means 4.

The sensor 2, information processing means 3 and information reproducing means 4 can be appropriately assigned to the parts of information processing, in the same way as in the embodiment explained with reference to FIG. 6. The communication paths 85 and 87 may be any means available, such as wired transmission, wireless transmission including wireless LAN, and IP communication via the Internet. Further, terminals 22 and 23 can be implemented as portable devices such as personal digital assistants (PDAs), personal computers (PCs) or cellular telephones.

The present embodiment shown in FIG. 11 is similar in configuration to the embodiment of FIG. 6, except that the function of the terminal 21 is removed, that the information-inputting function of the sensor 2 is assigned to the terminal 24, and that the information reproducing function of the information reproducing means 4 is assigned to the robot 25.

The server 40 may be configured to transmit the information output from the information changing means 401, to two or more robots. In this configuration, the terminal 24 can make appropriate communication with the robots, and the robots can be assigned to parts of the information processing. Hence, smooth, high-quality communication can be accomplished. Since the sensor 2 is provided in the terminal 24 and thus arranged near the signal source, the rate of recognizing the sound or images can increase. This contributes to the smooth, high-quality communication.

In the present embodiment, the information changing means 5 is configured, as described above, to add information to, or delete information from, the result of information processing, which has been obtained by the information processing means 3. A value such as emotional expression or detailed information can therefore be added to the result of the processing that has been correctly carried out. This helps to accomplish smooth communication. Moreover, the processing can be performed at high efficiency to achieve smooth communication, because the sever 40 is assigned to a process that includes many operations and the terminal 23 is assigned to a small-scale process and interface operations.

Further, according to the present embodiment, the rate of recognizing the sound or images can increase since the sensor 2 is provided in the terminal 24 and thus arranged near the signal source. This contributes to the smooth, high-quality communication.

Embodiment 7

An apparatus using the information processing system described with reference to FIGS. 1 to 5, which represents information such as an added value in the form of the motion of an agent displayed as an image, will be described with reference to FIGS. 12 to 17. This apparatus can be used in car navigation, language-teaching systems, translating machines, interpretation machines, and the like. The functions of the information processing means, information changing means and overall control unit of this apparatus can be implemented by the software installed in a personal computer. FIG. 12 is a block diagram of an apparatus according to this embodiment, illustrating the configuration thereof. FIG. 13 is a diagram showing how the user inputs information to the sensor. FIG. 14 is a diagram depicting an apparatus that uses a microphone as sensor 2. FIGS. 15 to 17 are diagrams explaining how the agent moves on the information reproducing means 4.

As shown in FIGS. 12 to 14, the apparatus according this embodiment includes a main body 1, a sensor 2 (microphone 21), an information processing means 3, an information changing means 5, an information reproducing means 6 and an overall control unit 6. All of these means, but the information reproducing means 4, operate as has been explained above. Only the information reproducing means 4 will be described.

The information reproducing means 4 can be a flat display device such as a liquid crystal display or an EL display, a CRT, or the like. As FIG. 15 shows, an agent may move up and down on the screen 41. As FIG. 16 shows, the agent may move slantwise, while rotating, on the screen 41 in accordance with added information. Further, as FIG. 17 depicts, the agent may move up and down, while rotating. So moving, the agent can represent added information. In the information reproducing apparatus 4 shown in FIGS. 15 to 17, the speakers 42 to 45 can generate sound and the screen 41 can display the agent. As has been explained, the agent can make not only motions that man usually does, such as nodding, leaning of head, wagging of head and jumping, but also motions that man would never make. Examples of the special motions the agent or the robot can make are the expansion and contraction of body and separation of body. Further, the agent can make its copies in large or small numbers.

Further, the speakers 42 to 45 can be used to control the position of the audio image. That is, the amplitude and phase of the signal supplied to each speaker are controlled appropriately, thereby controlling the volume of reproduced sound at a specific distance and in a specific direction.

Industrial Applicability

The present invention can be applied to an information processing system that performs interpretation, translation, conversation, voice recognition, voice synthesis, image understanding, and the like, to a robot that functions as this system, and to a program that enables a computer to work as the system.

BRIEF DESCRIPTION OF DRAWINGS

FIG. 13 is a diagram explaining how the user of the apparatus inputs information to the sensor;

EXPLANATION OF REFERENCES

Figure 1:
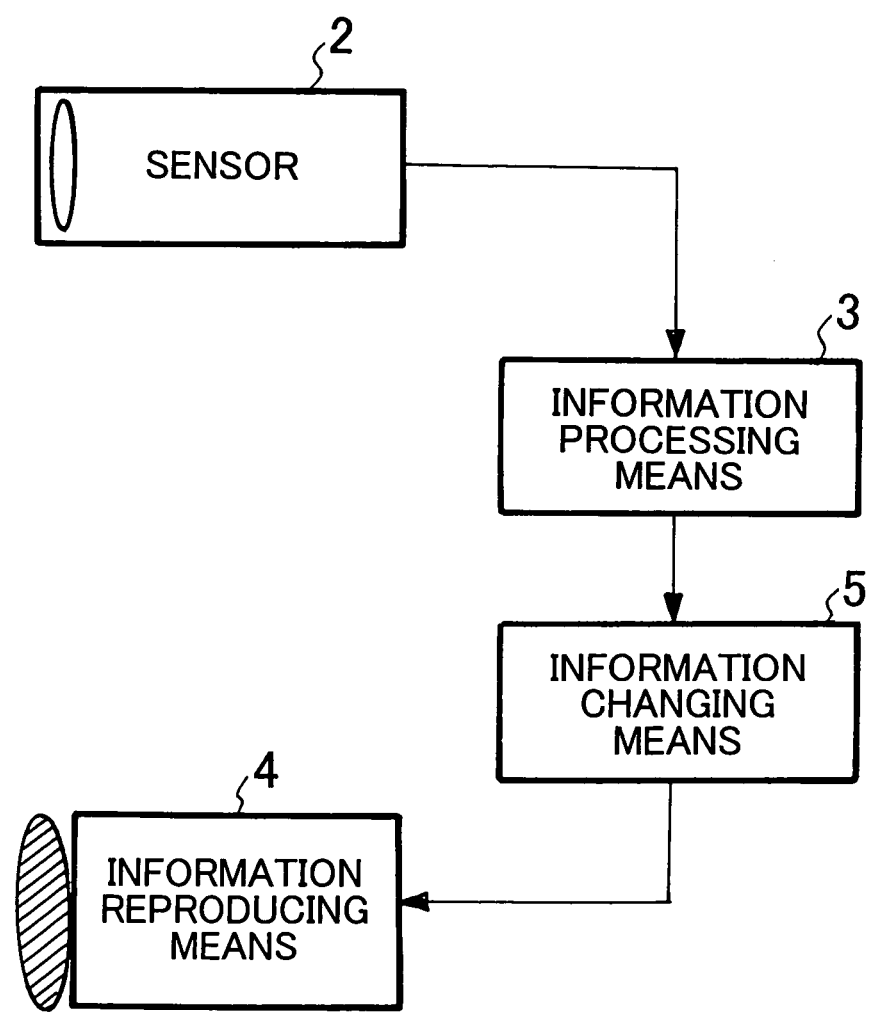
FIG. 1 is a block diagram illustrating an example of the configuration according to a first embodiment of the present invention.
Figure 2:
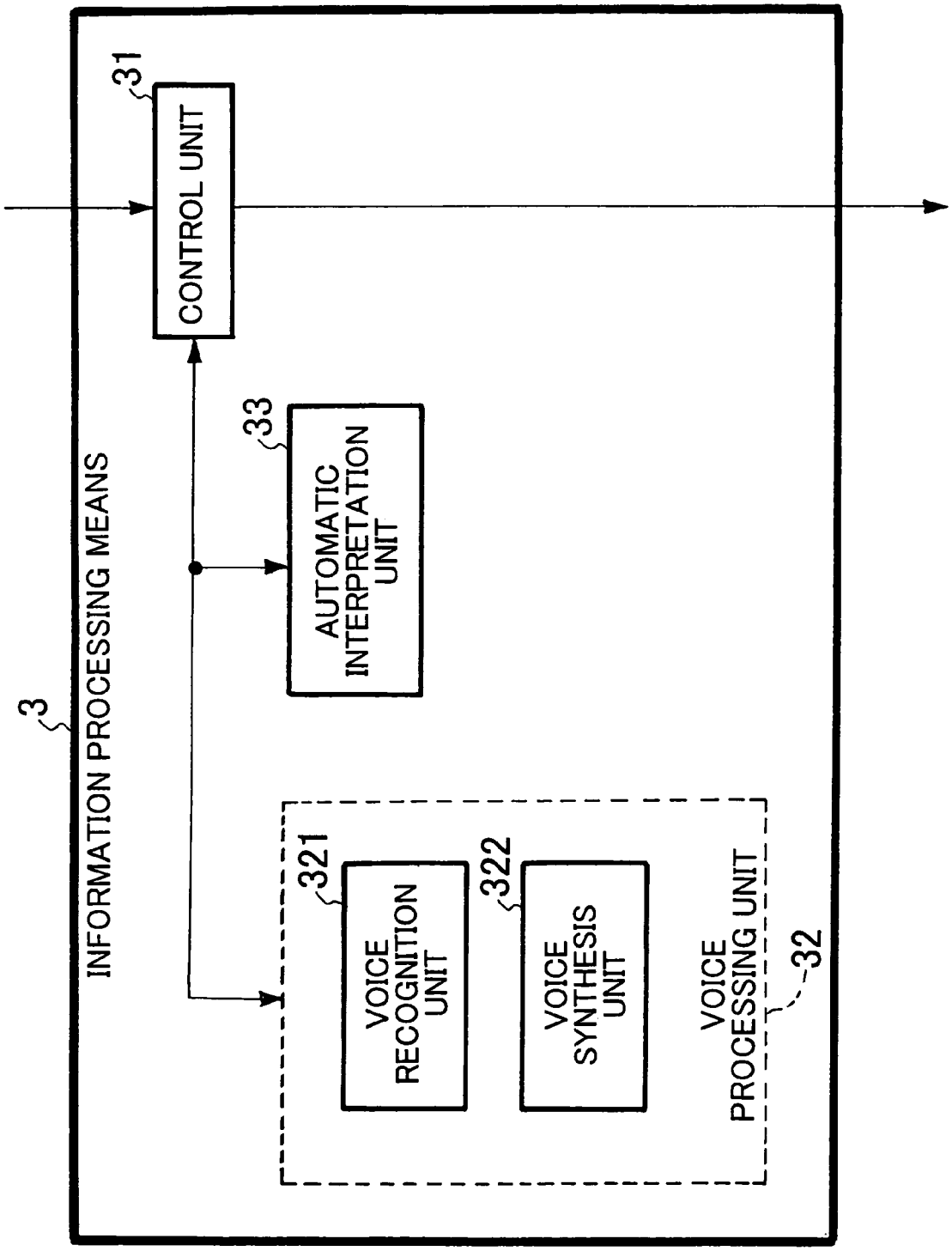
FIG. 2 is a block diagram illustrating a first example of the information processing means used in the first embodiment of the present invention.
Figure 3:
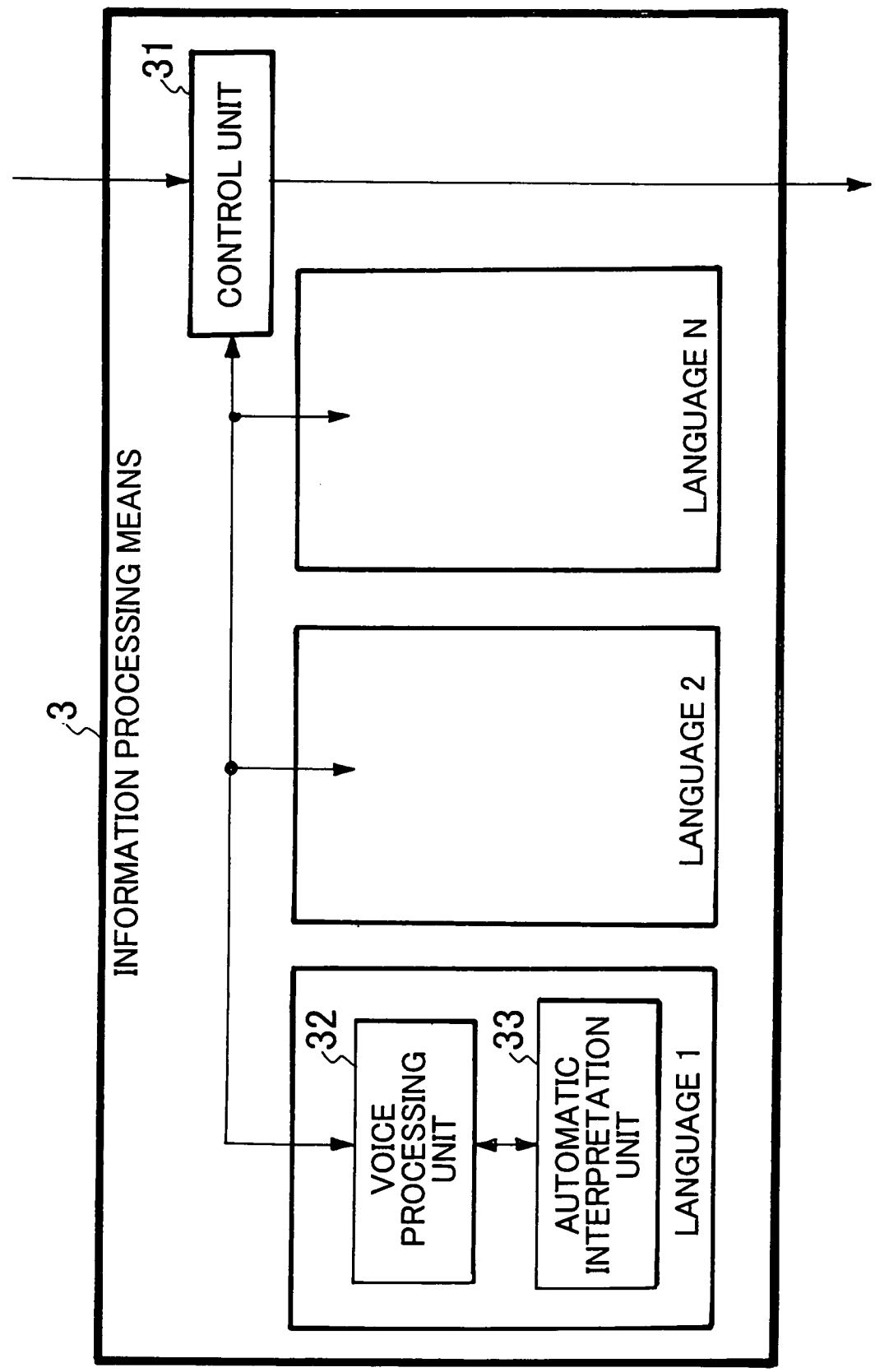
FIG. 3 is a block diagram illustrating a second example of the information processing means used in the first embodiment of the present invention.
Figure 4:
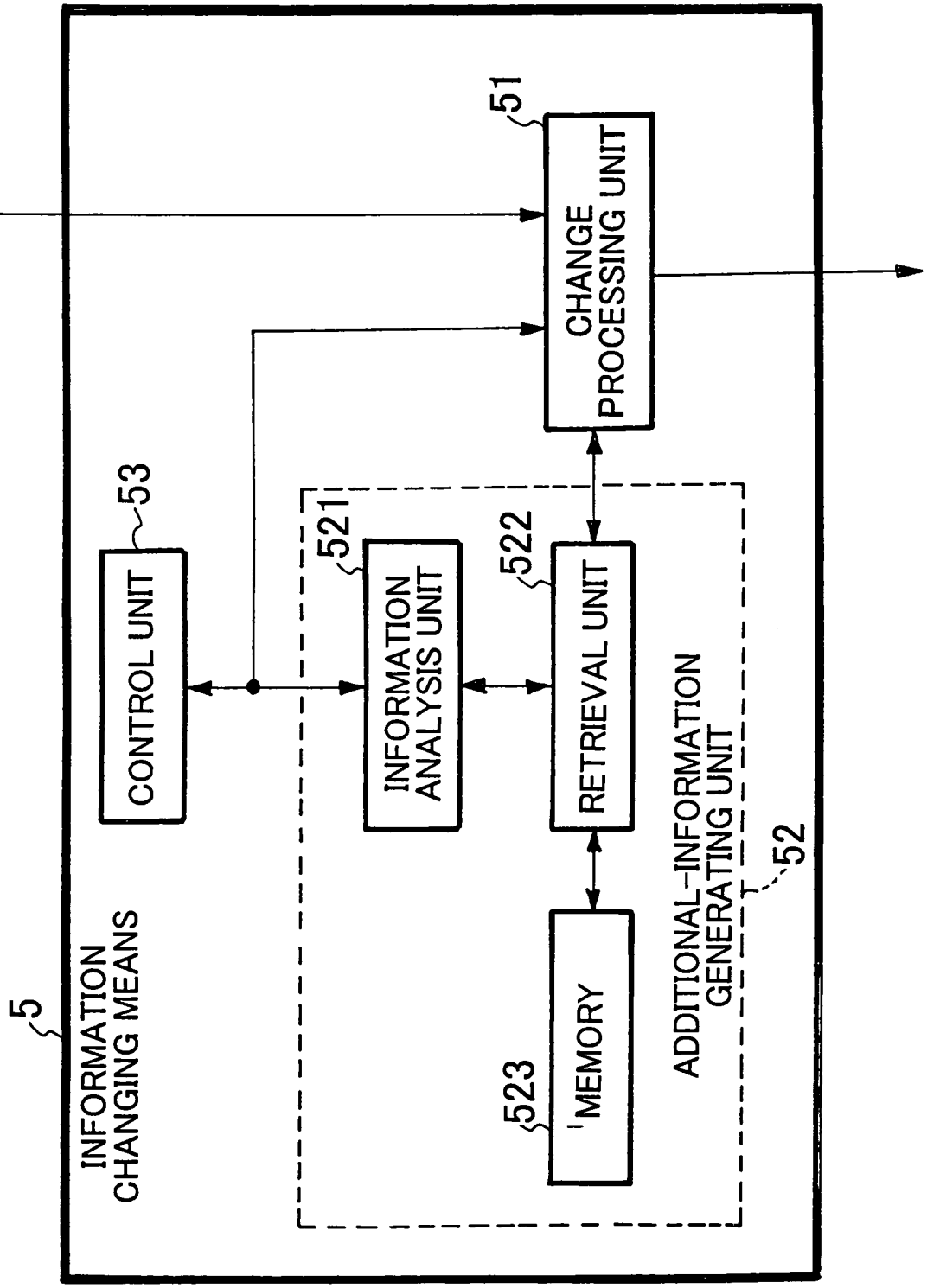
FIG. 4 is a block diagram illustrating a first example of the information changing means used in the first embodiment of the present invention.
Figure 5:
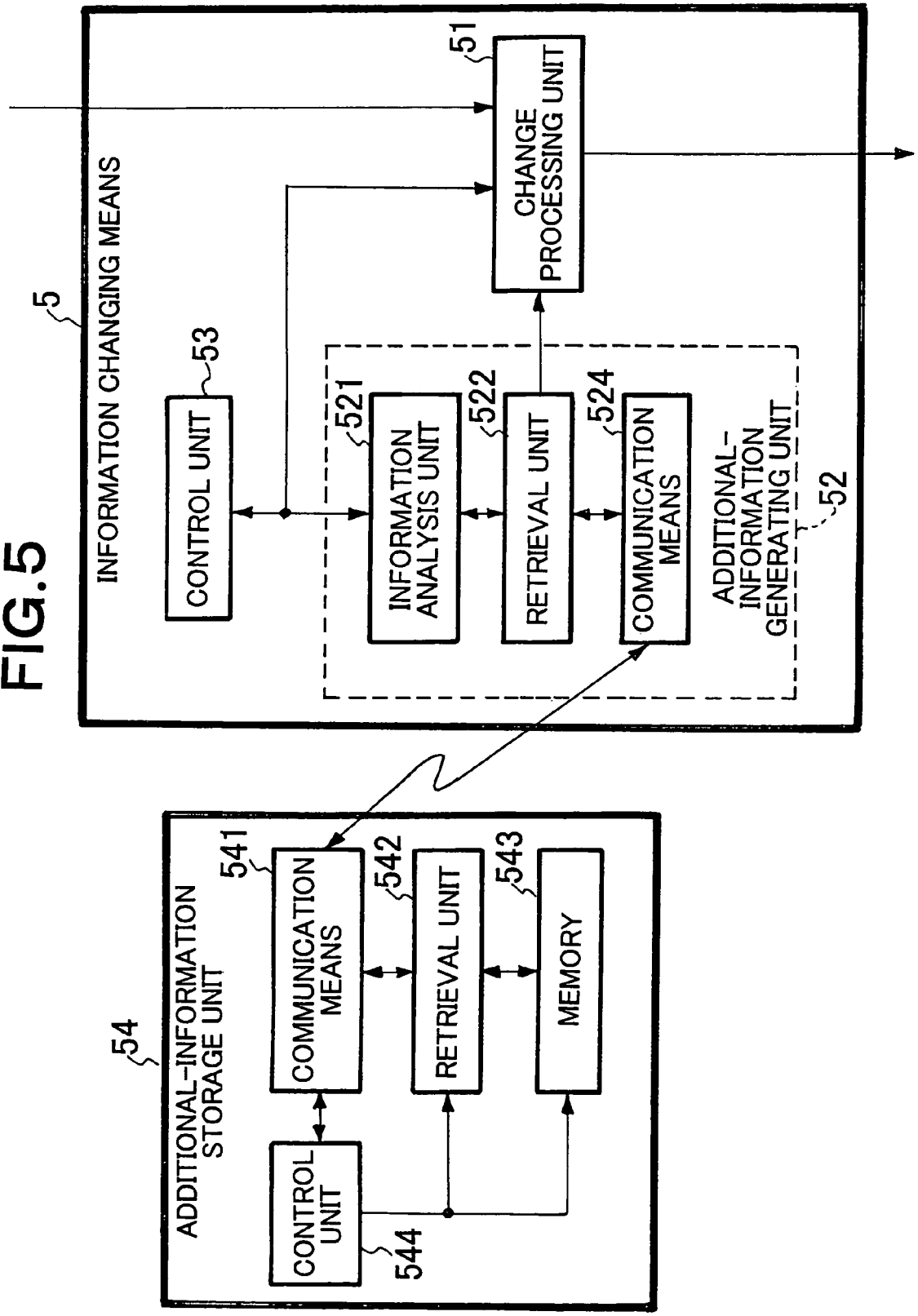
FIG. 5 is a block diagram illustrating a first example of the information changing means used in the first embodiment of the present invention.
Figure 6:
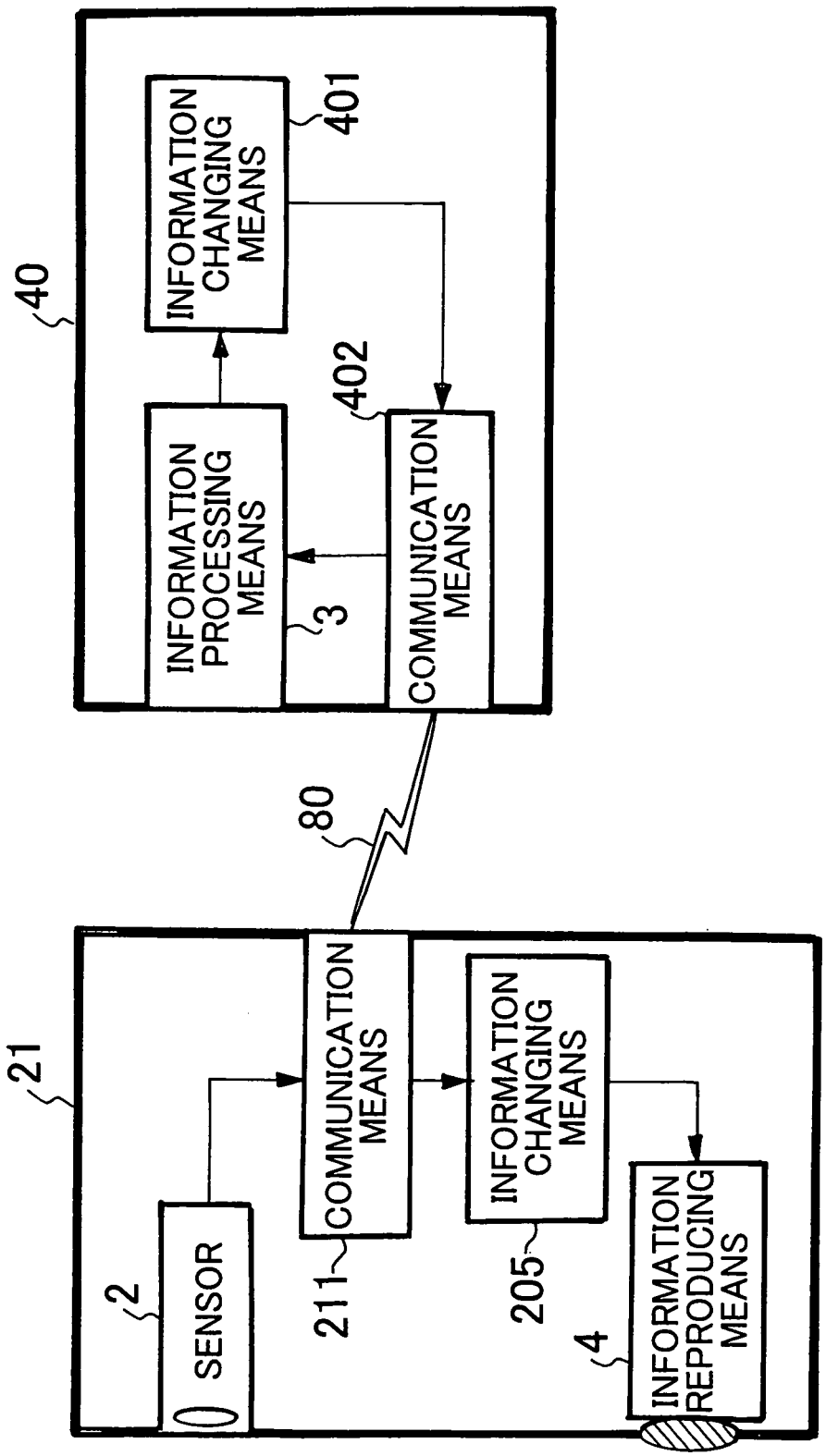
FIG. 6 is a block diagram illustrating an example of the configuration according to a second embodiment of the present invention.
Figure 7:
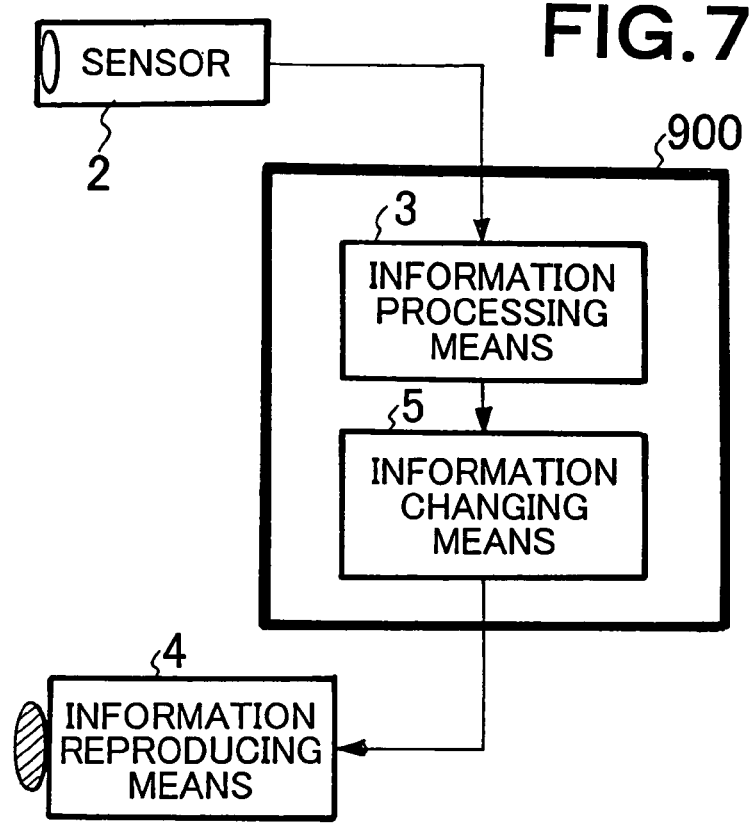
FIG. 7 is a block diagram illustrating an example of the configuration according to a third embodiment of the present invention.
Figure 8:
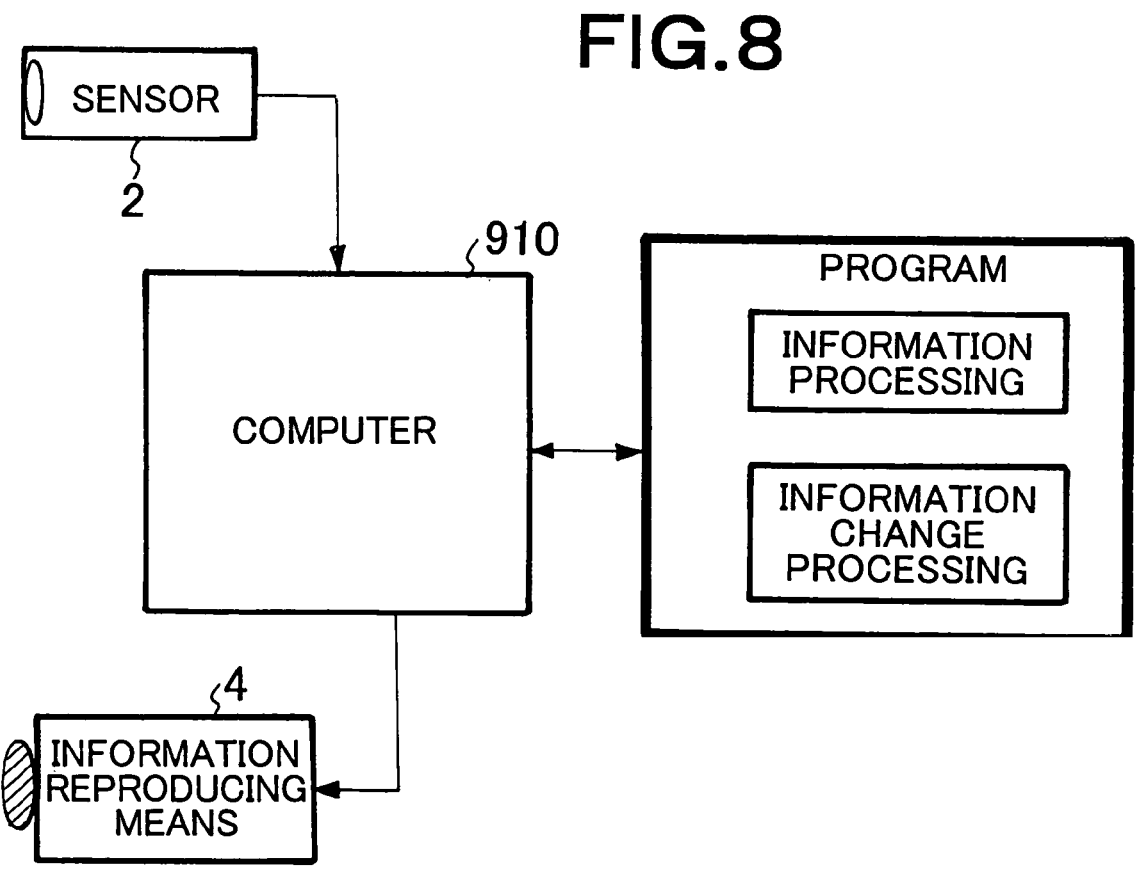
FIG. 8 is a block diagram illustrating another example of the configuration according to the third embodiment of the present invention.
Figure 9:
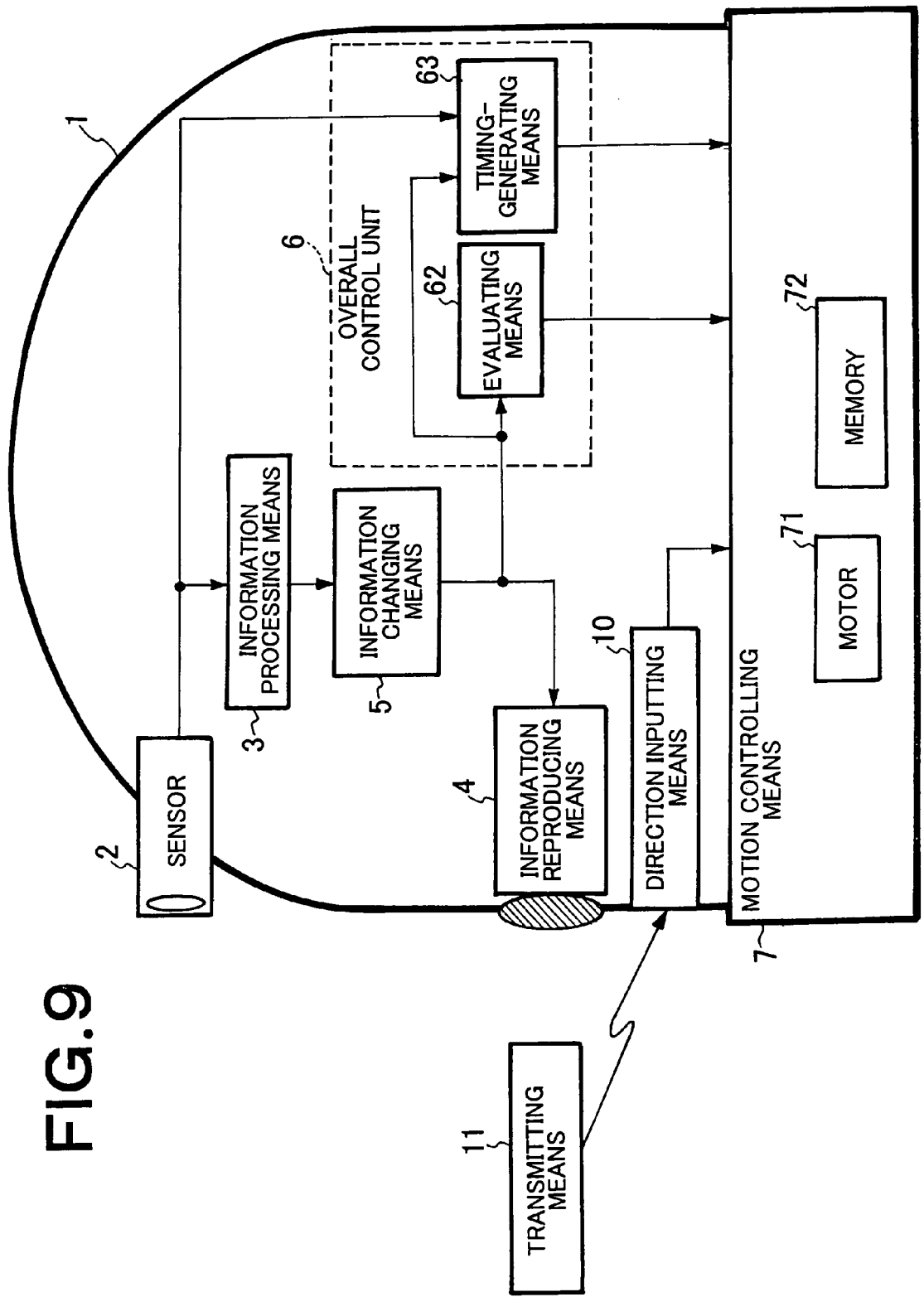
FIG. 9 is a block diagram illustrating an example of the configuration according to a fourth embodiment of the present invention.
Figure 10:
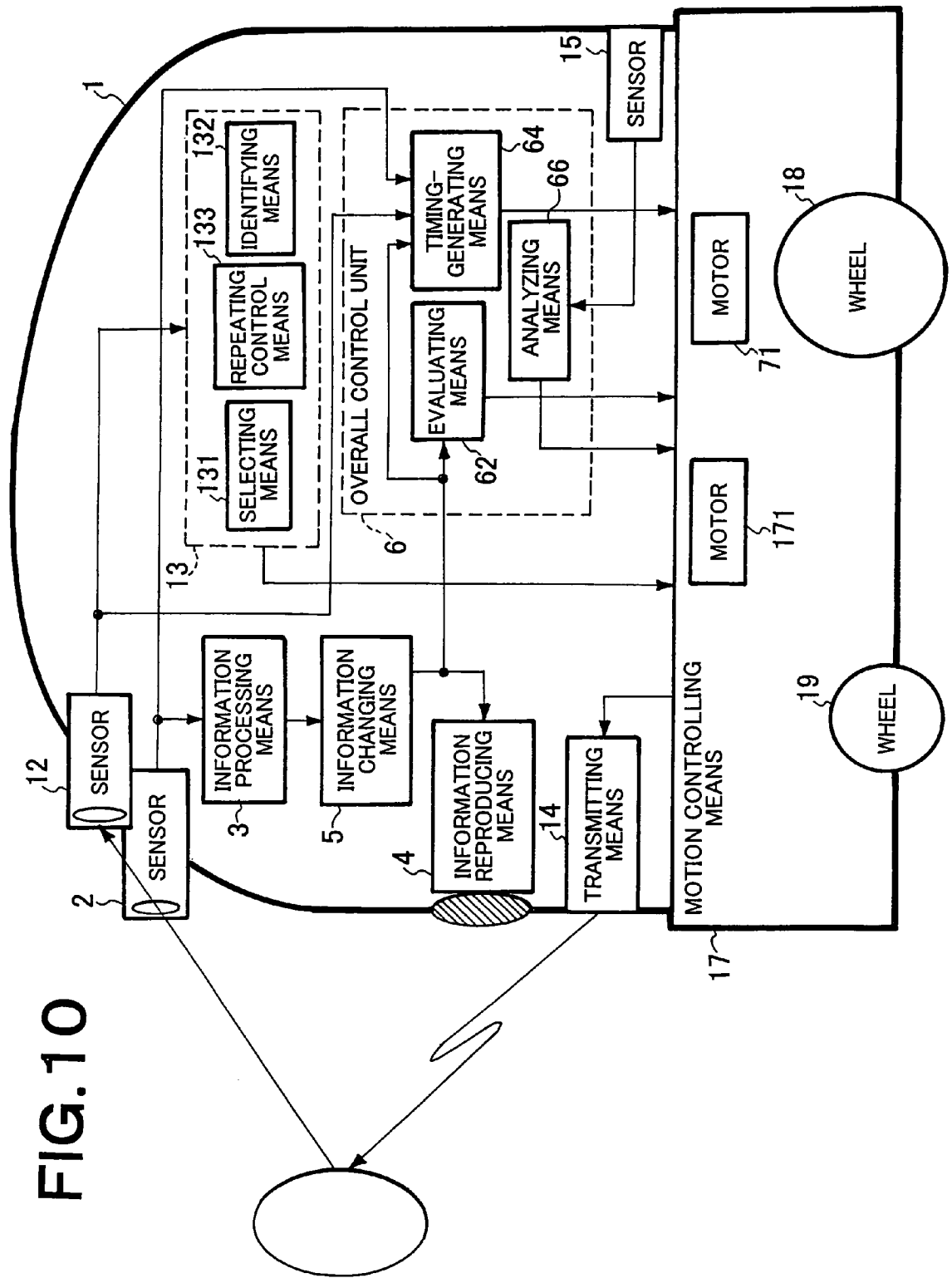
FIG. 10 is a block diagram illustrating an example of the configuration according to a fifth embodiment of the present invention.
Figure 11:
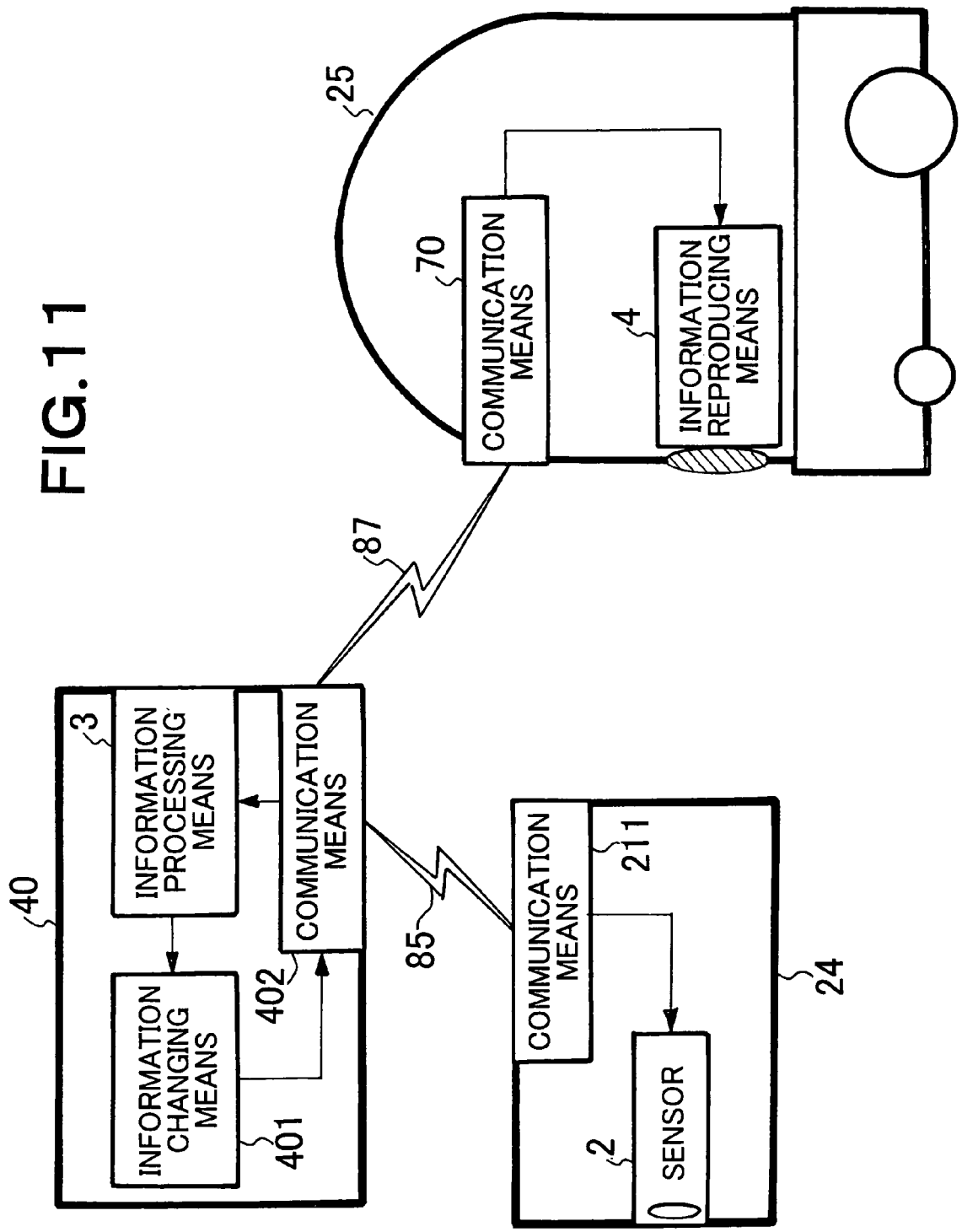
FIG. 11 is a block diagram illustrating an example of the configuration according to a sixth embodiment of the present invention.
Figure 12:
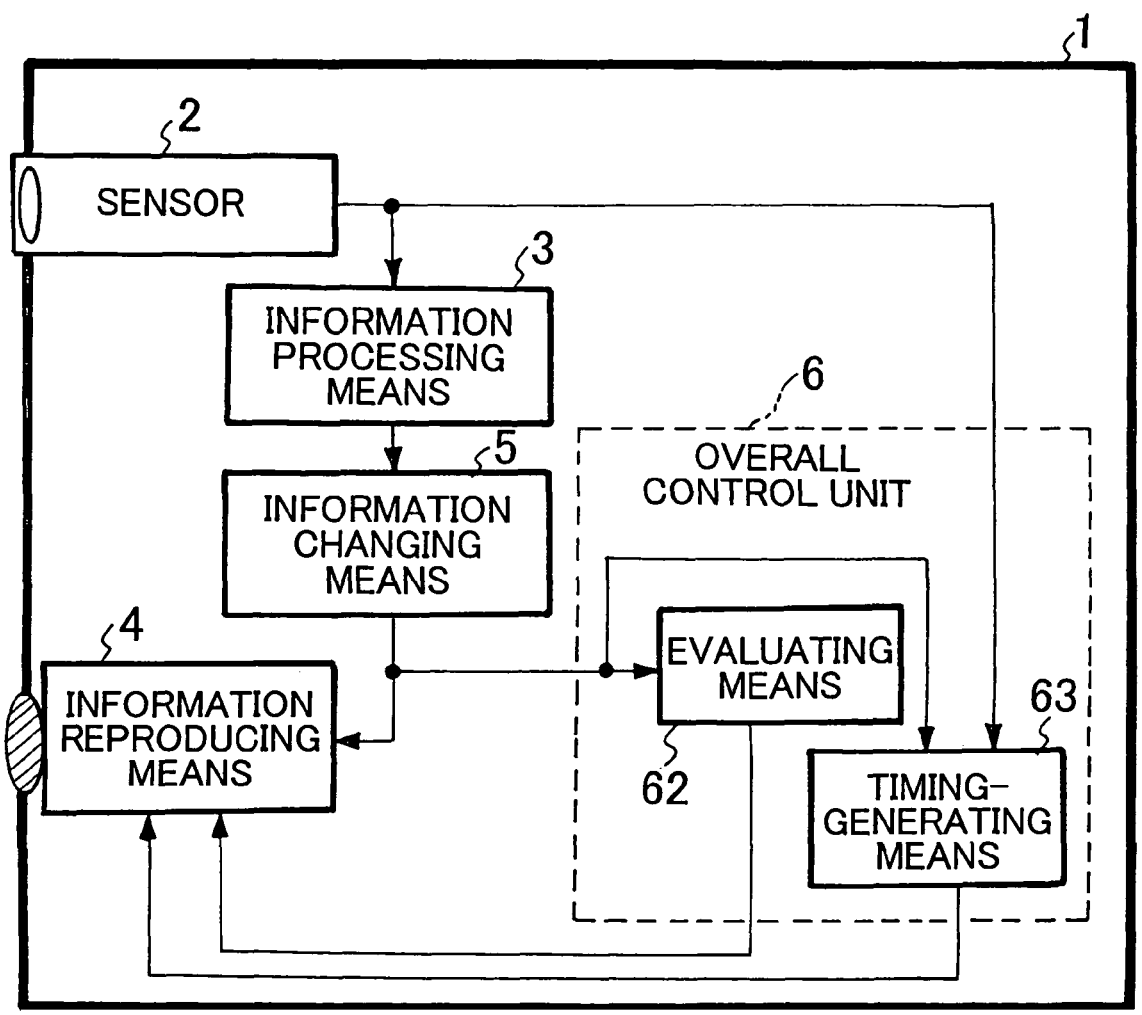
FIG. 12 is a block diagram illustrating an example of the configuration according to a seventh embodiment of the present invention.
Figure 14:
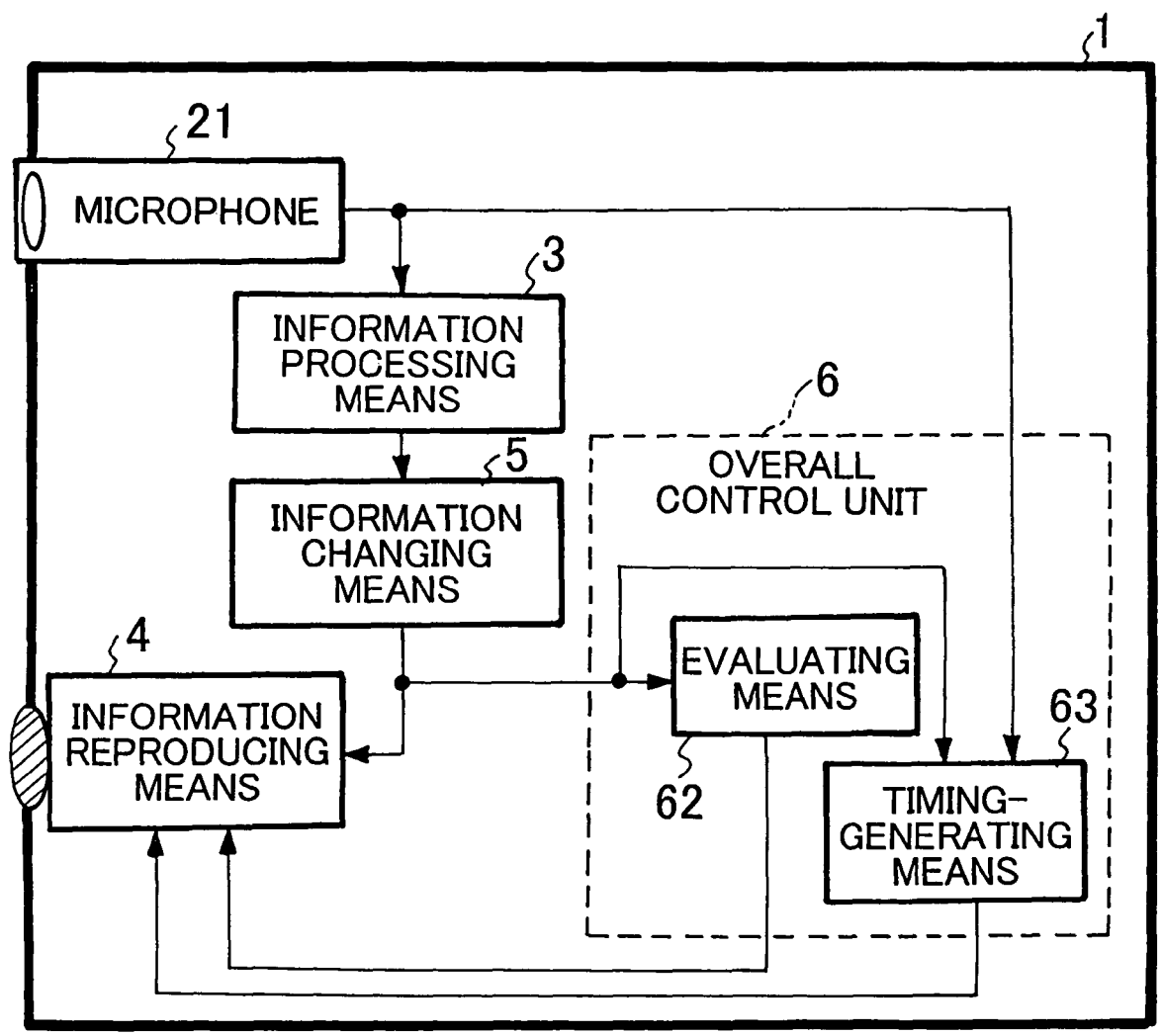
FIG. 14 is a diagram illustrating the apparatus that uses a microphone as sensor 2.
Figure 15:
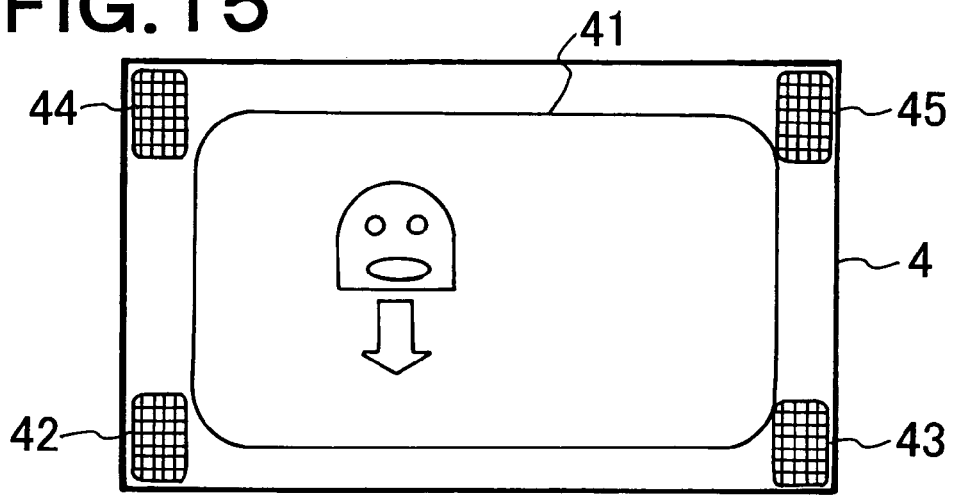
FIG. 15 is a diagram explaining how the agent moves on the information reproducing means 4.
Figure 16:
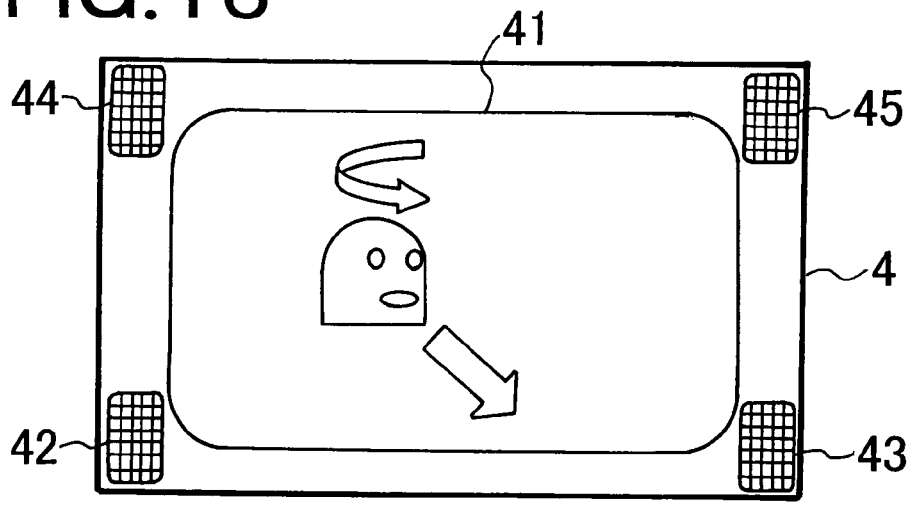
FIG. 16 is another diagram explaining how the agent moves on the information reproducing means 4.
Figure 17:
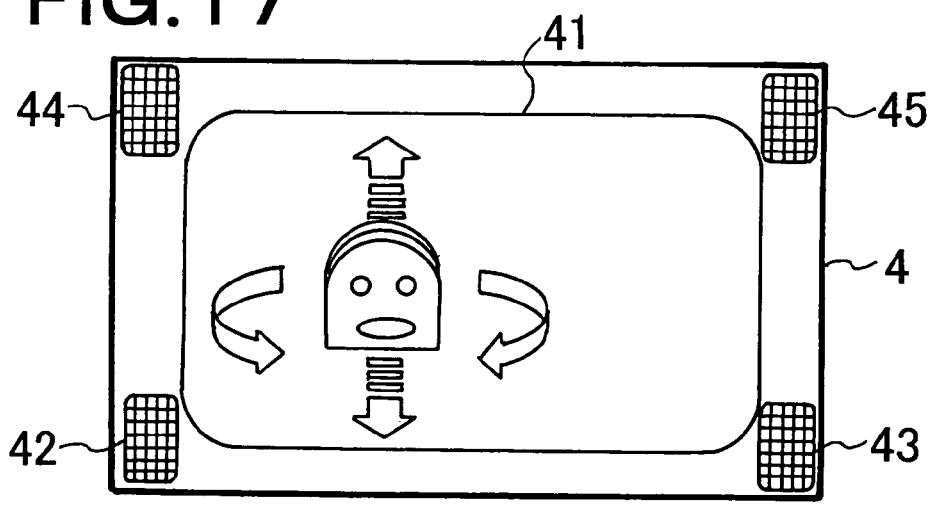
FIG. 17 is a further diagram explaining how the agent moves on the information reproducing means 4.

1: Robot body (Main body)
2, 12, 15: Sensor
21, 24: Terminal
211, 402, 70: Communication means
3: Information processing means
31, 53, 544: Control unit
32: Voice processing unit
321: Voice recognition unit
322: voice synthesis unit
33: Automatic interpretation unit
4: Information reproducing means
40: Server
25: Robot
5, 401: Information changing means
50: Network
51: Change processing unit
52: Additional-information generating unit
521: Information analysis unit
522, 542: Retrieval unit
523, 543, 72: Memory
524, 541: Communication means
54: Additional-information storage unit
6: Overall control unit
62: Evaluating means
63, 64: Timing generating means
7, 17: Motion controlling means
71, 171: Motor
80, 85, 87: Communication path
11, 14: Transmitting means
10: Direction inputting means
13: Direction identifying means
131: Selecting means
132: Identifying means
133: Repeating control means
18, 19: Wheel

The invention claimed is:

1. A method of processing information, which comprises:
converting text of a second language to a first voice signal and outputting the first voice signal, with an information reproducing device;
receiving response of a first language from a target for which the first voice signal is output, with an information processing device;
translating the response from the first language to the second language, with an interpretation device;
evaluating a time interval from the text of a second language input to the information reproducing device, to the translation of the response and when detecting a delay of the response on the basis of the evaluation result, adding information to the translated response, with the information analysis device; and
converting the translated response to which the information is added, to a second voice signal, and outputting the second voice signal, with the information reproducing device.

2. The method according to claim 1, wherein the information includes an expression prompting an answer or an expression of agreement.

3. An information processing system comprising:
an information reproducing device configured to convert text of a second language to a first voice signal and output the first voice signal;
an information processing device configured to receive response of a first language from a target for which the first voice signal is output;
an interpretation device configured to translate the response from the first language to the second language; and
an information analysis device configured to evaluate a time interval from the text of a second language input to the information reproducing device, to the translation of the response and when detecting a delay of the response on the basis of the evaluation result, add information to the translated response,
wherein the information reproducing device is configured to convert the translated response to which the information is added, to a second voice signal, and output the second voice signal.

4. The information processing system according to claim 3, wherein the information includes an expression prompting an answer or an expression of agreement.

5. A non-transitory computer-readable medium having machine instructions stored therein, the instructions being executable by one or more processors to cause the one or more processors to perform operations comprising:
converting text of a second language to a first voice signal and outputting the first voice signal;
receiving response of a first language from a target for which the first voice signal is output;
translating the response from the first language to the second language;
evaluating a time interval from the text of a second language input, prior to the converting, to the translation of the response and when detecting a delay of the response on the basis of the evaluation result, adding information to the translated response; and
converting the translated response to which the information is added, to a second voice signal, and outputting the second voice signal.

6. The non-transitory computer-readable medium according to claim 5, wherein the information includes an expression prompting an answer or an expression of agreement.

7. A terminal comprising:
an information reproducing device configured to convert text of a second language to a first voice signal and output the first voice signal;
an information processing device configured to receive response of a first language from a target for which the first voice signal is output;
a communication device configured to communicate with a server, the server translating the response from the first language to the second language and transmit the translated response to the terminal;
an information analysis device configured to receive the translated response through the communication device and evaluating a time interval from the text of a second language input to the information reproducing device, to the translation of the response by the server and when detecting a delay of the response on the basis of the evaluation result, add information to the translated response,
wherein the information reproducing device is configured to convert the translated response to which the information is added to a second voice signal and output the second voice signal.

8. The terminal according to claim 7, wherein the information includes an expression prompting an answer or an expression of agreement.

9. A server comprising:
a communication device configured to communicate with a terminal, the terminal configured to convert text of a second language to a first voice signal and output the first voice signal;
an information processing device configured to receive, through the communication device, response of a first language from a target for which the first voice signal is output;
an interpretation device configured to translate the response from the first language to the second language; and
an information analysis device configured to evaluate a time interval from the text of a second language input to the terminal, to the translation of the response and when detecting a delay of the response on the basis of the evaluation result, add information to the translated response,
wherein the translated response to which the information is added is transmitted to the terminal through the communication device.

10. The server according to claim 9, wherein the information includes an expression prompting an answer or an expression of agreement.

* * * * *

UNITED STATES PATENT AND TRADEMARK OFFICE
CERTIFICATE OF CORRECTION

| | | |
|---|---|---|
| PATENT NO. | : 8,433,580 B2 | Page 1 of 1 |
| APPLICATION NO. | : 10/582360 | |
| DATED | : April 30, 2013 | |
| INVENTOR(S) | : Sugiyama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this
Thirtieth Day of December, 2014

Michelle K. Lee
*Deputy Director of the United States Patent and Trademark Office*